Feb. 10, 1953        G. T. RANDOL        2,627,953
PEDALLY-CONTROLLED POWER-OPERATED CLUTCH
Original Filed Dec. 10, 1941        15 Sheets—Sheet 1
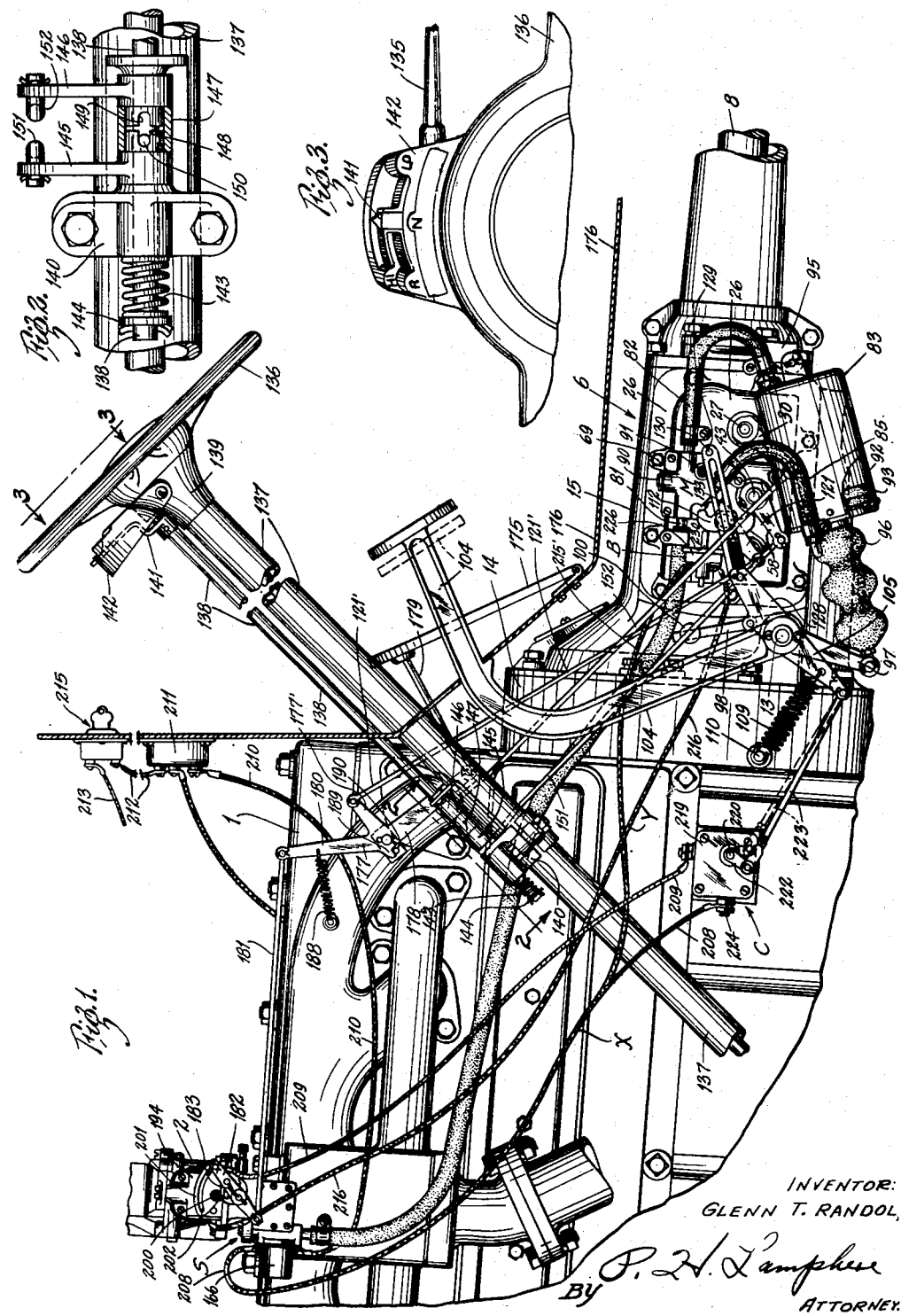
INVENTOR:
GLENN T. RANDOL,
By P. H. Lamphere
ATTORNEY.

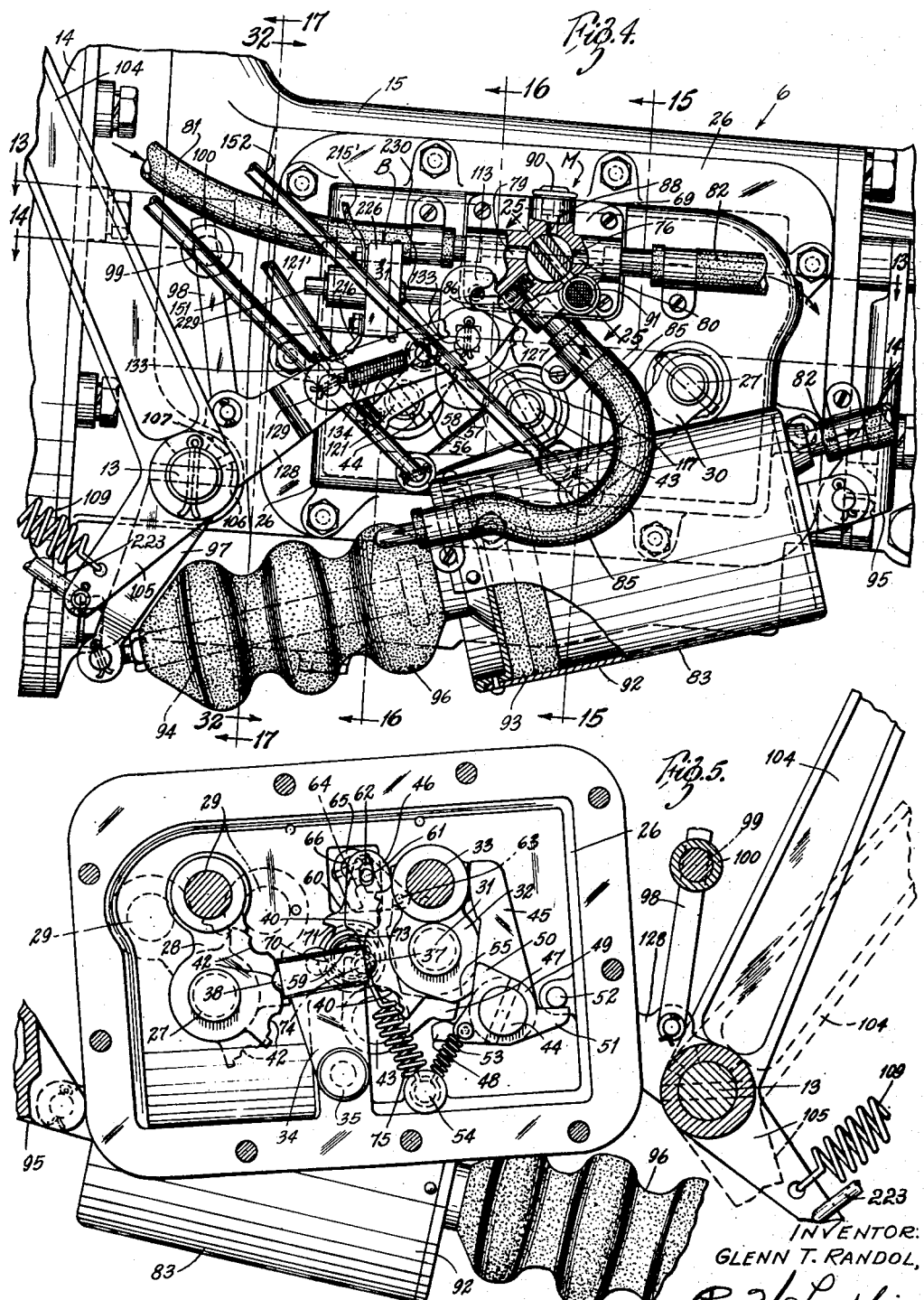

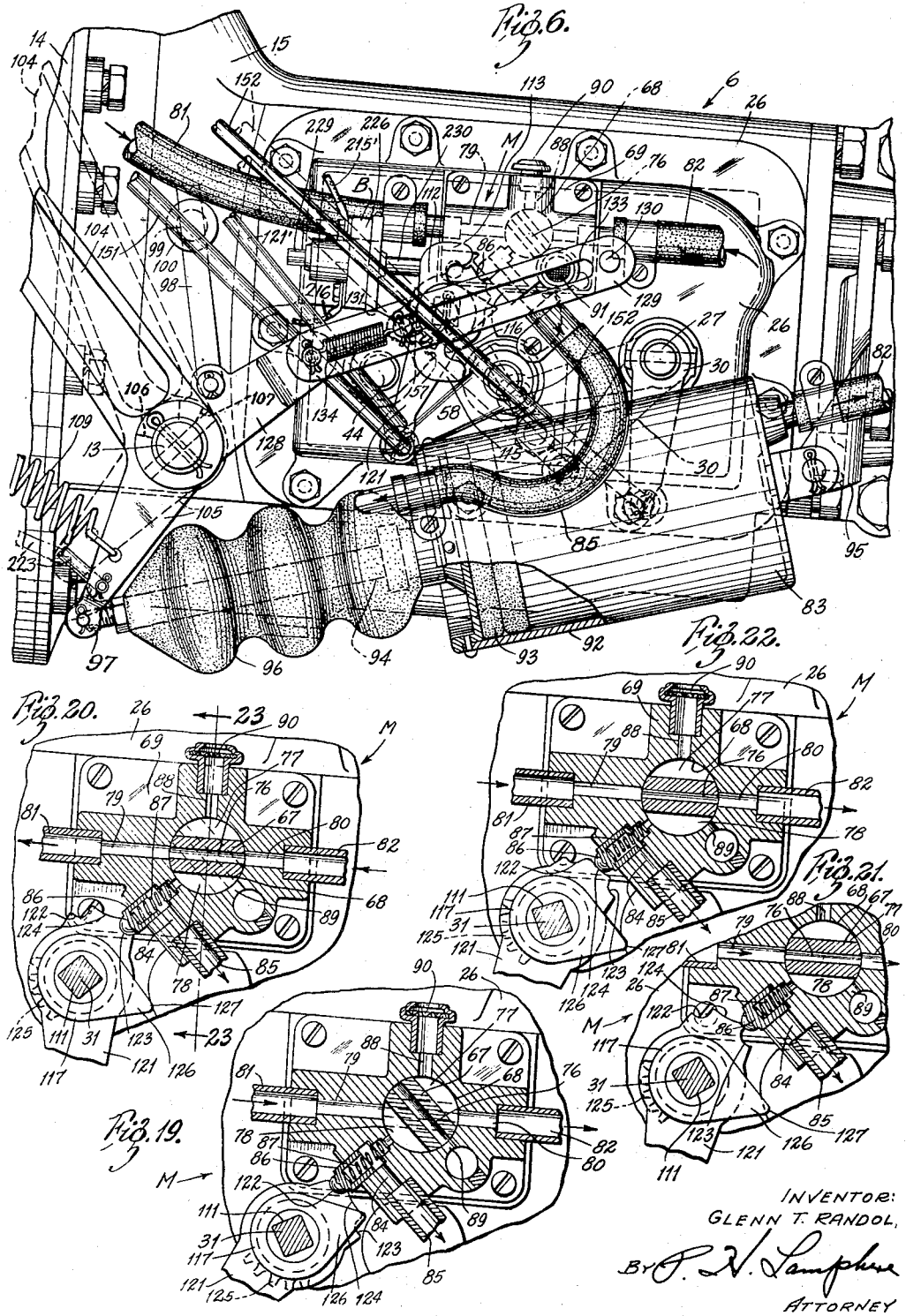

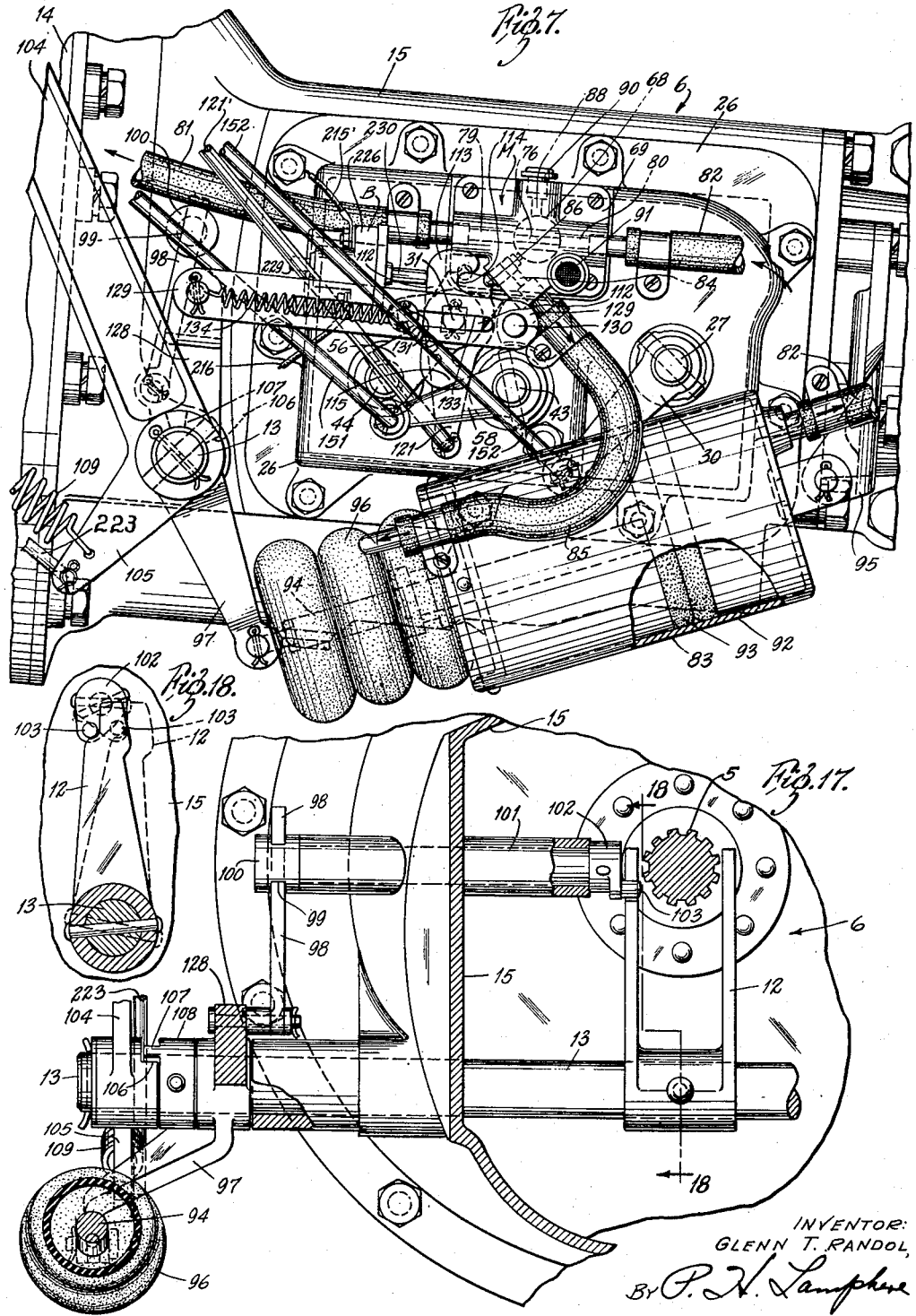

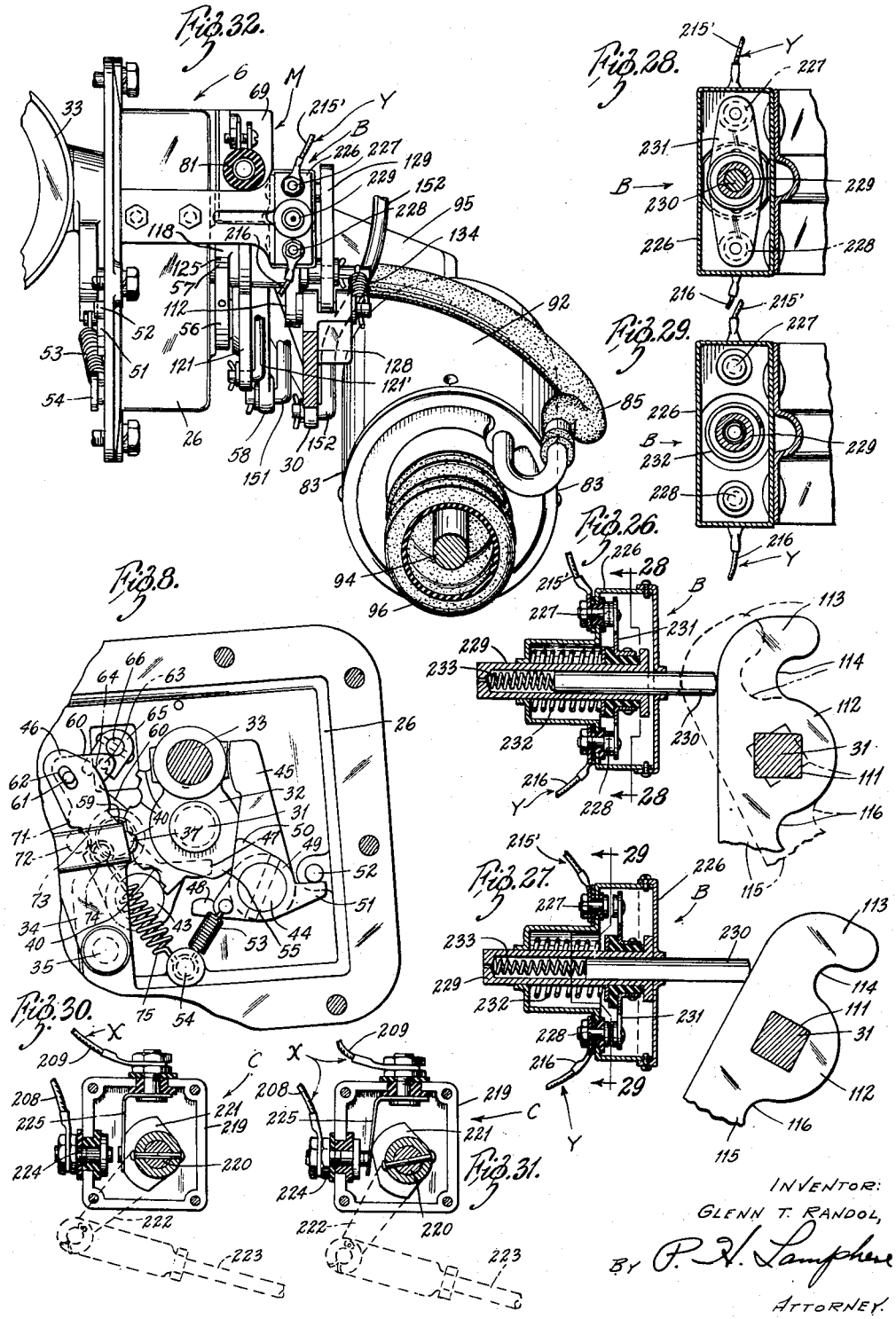

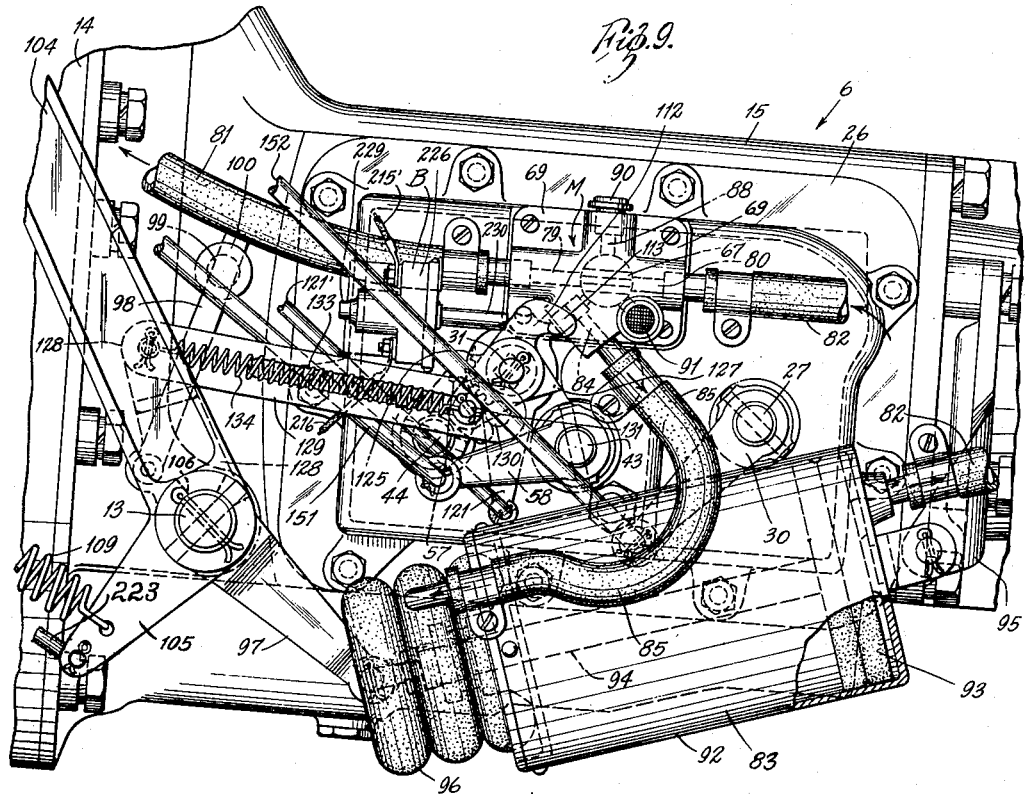
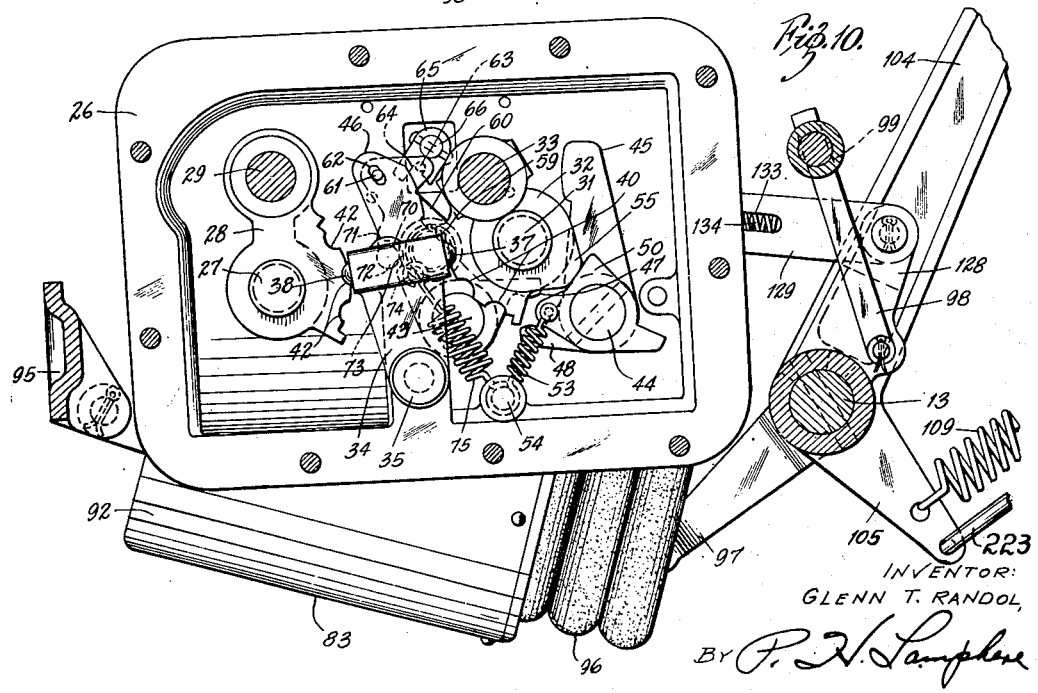

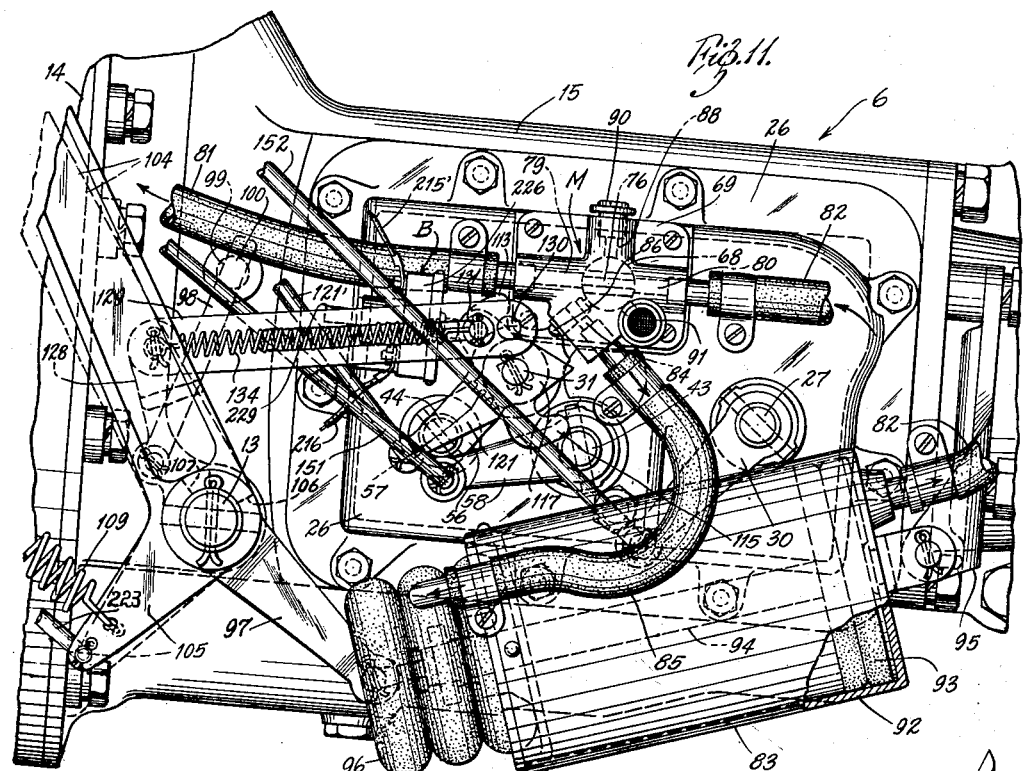
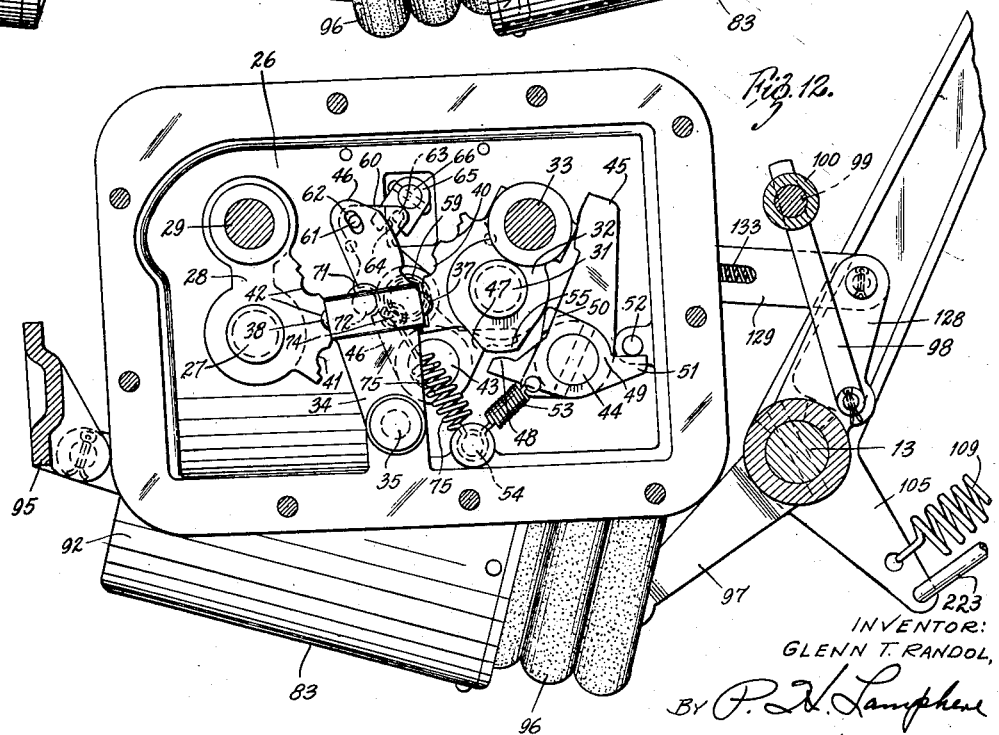

Feb. 10, 1953  G. T. RANDOL  2,627,953
PEDALLY-CONTROLLED POWER-OPERATED CLUTCH
Original Filed Dec. 10, 1941  15 Sheets-Sheet 8

INVENTOR:
GLENN T. RANDOL,
By P. N. Lamphere
ATTORNEY.

Feb. 10, 1953　　　　　G. T. RANDOL　　　　　2,627,953
PEDALLY-CONTROLLED POWER-OPERATED CLUTCH
Original Filed Dec. 10, 1941　　　　　　　　15 Sheets-Sheet 9
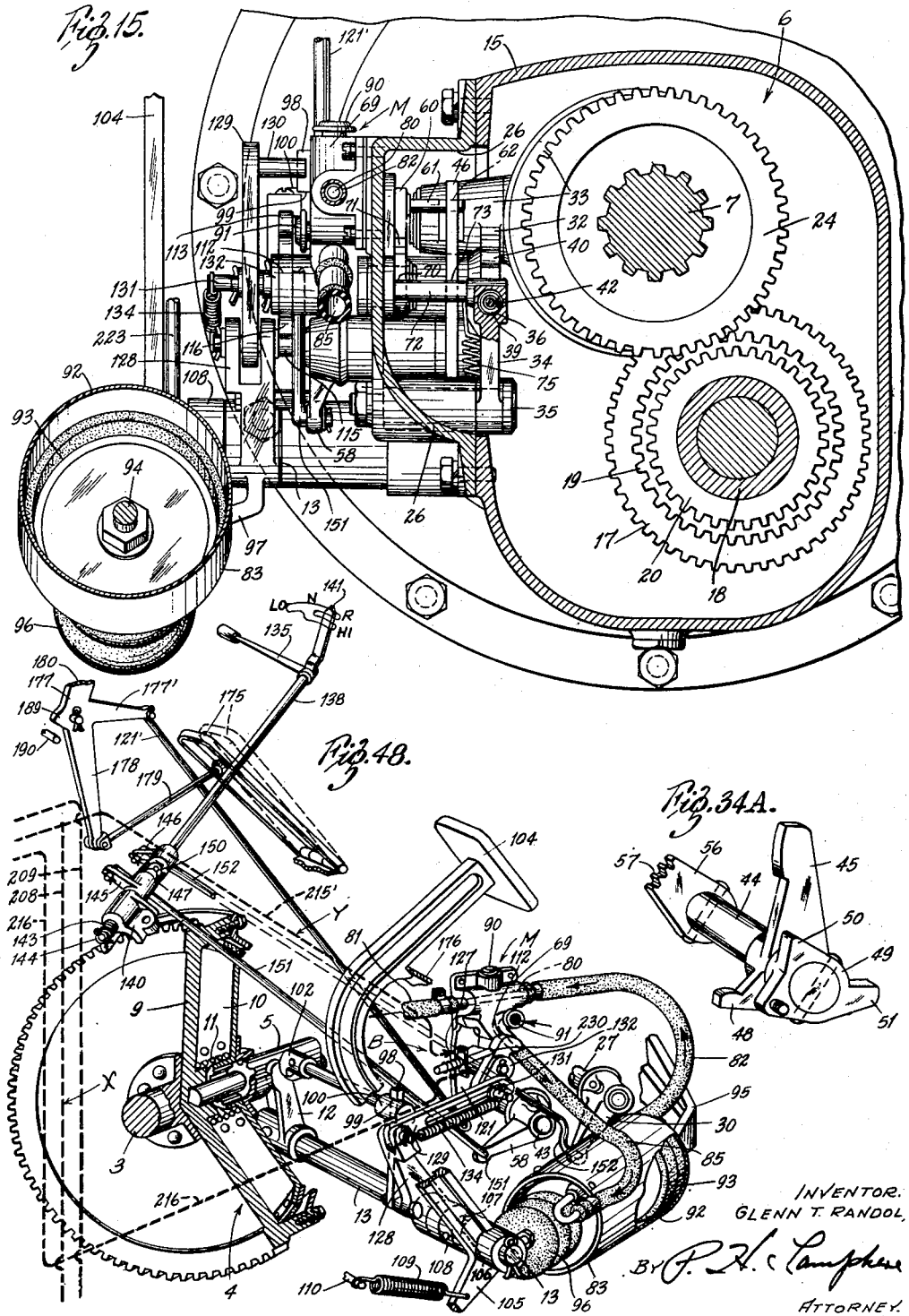

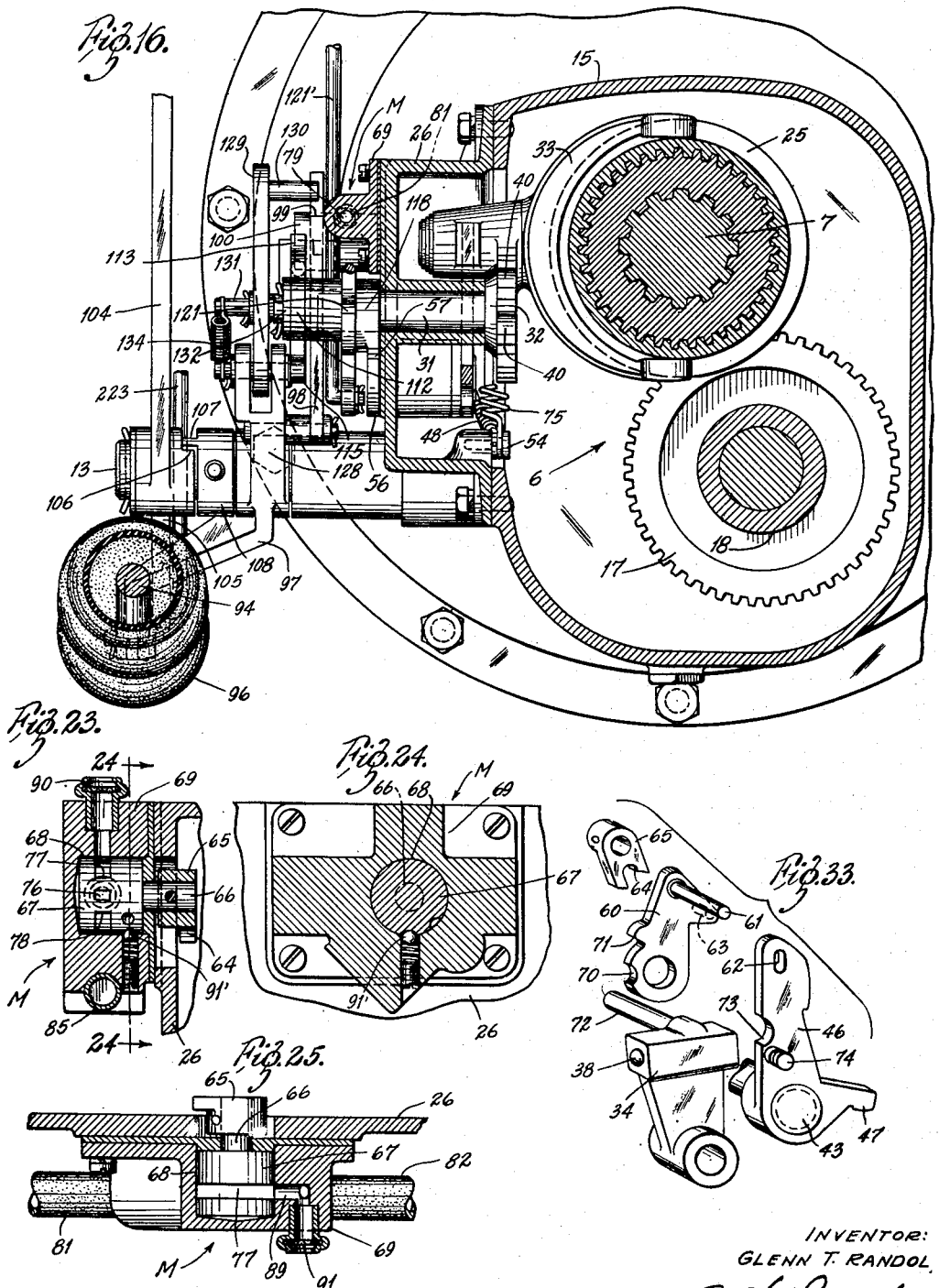

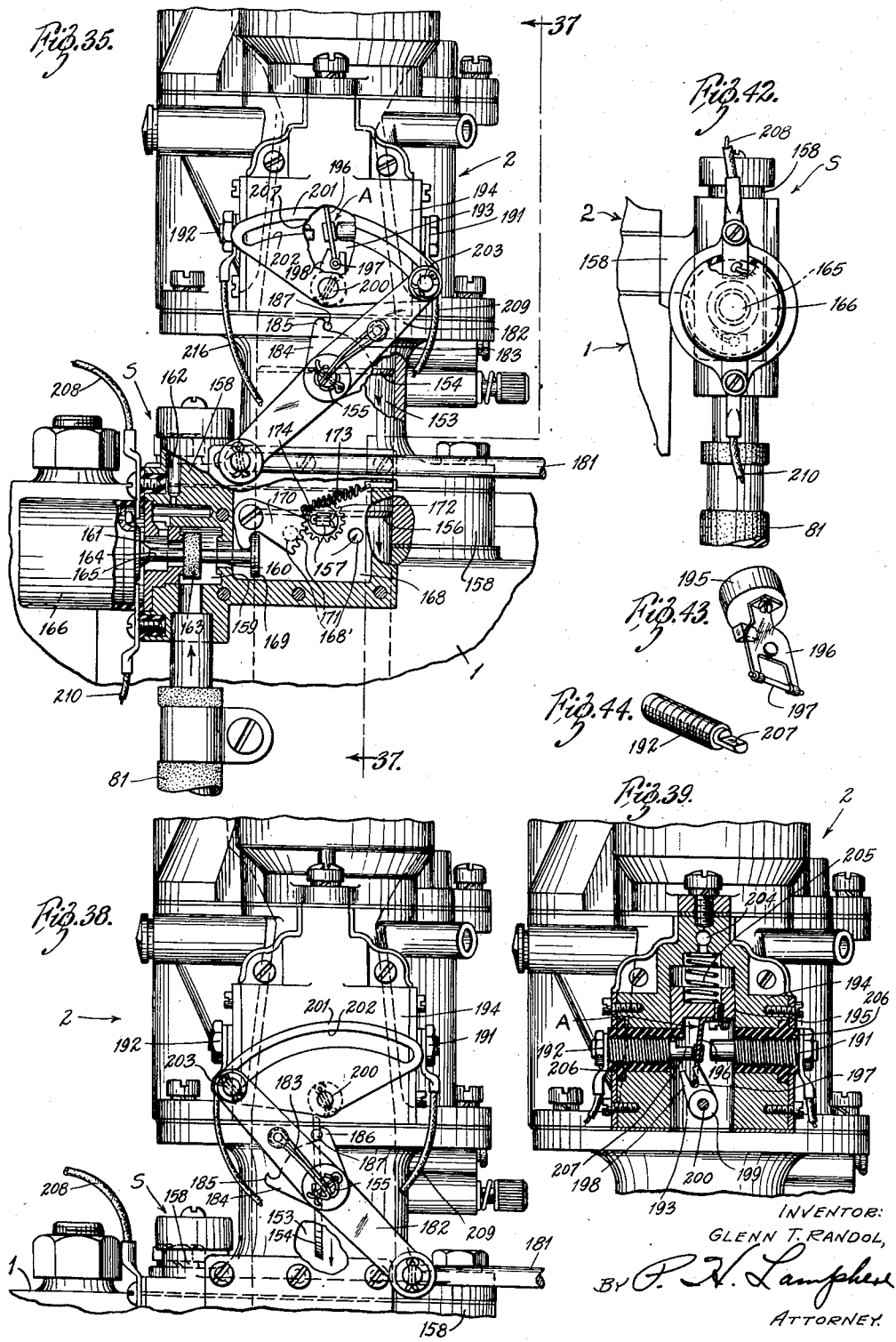

Feb. 10, 1953 G. T. RANDOL 2,627,953
PEDALLY-CONTROLLED POWER-OPERATED CLUTCH
Original Filed Dec. 10, 1941 15 Sheets-Sheet 12
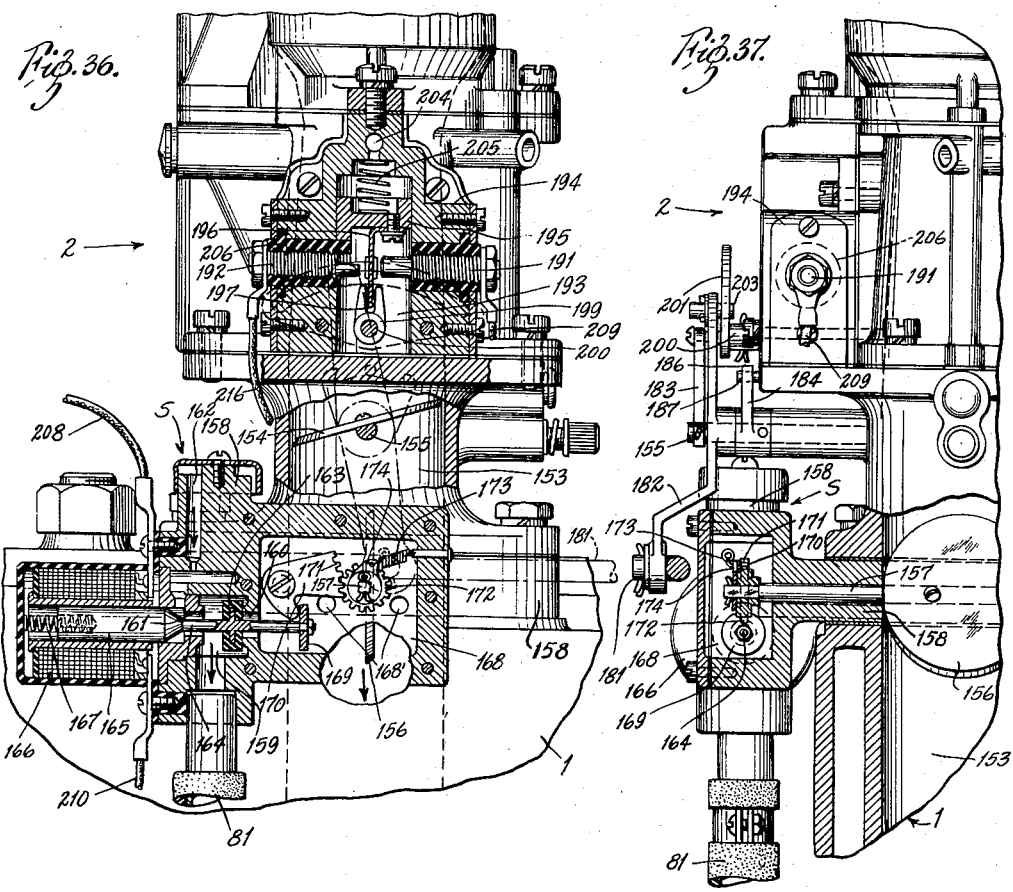
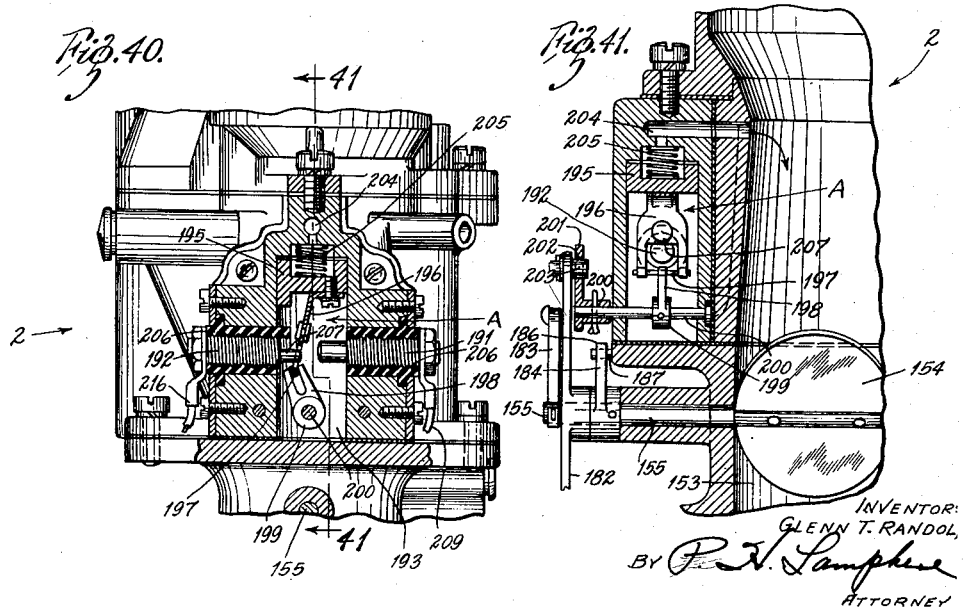
INVENTOR:
GLENN T. RANDOL,
BY
ATTORNEY

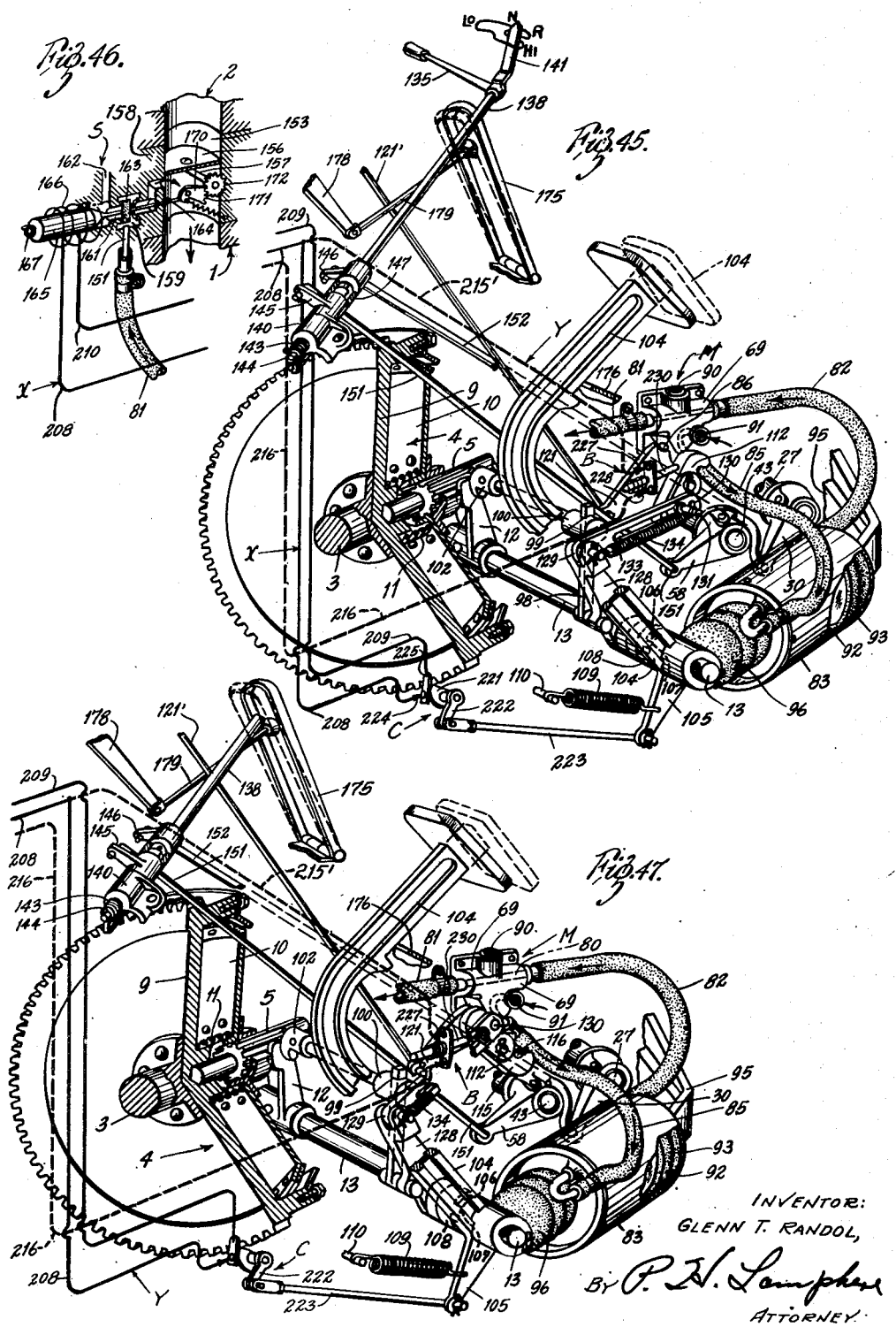

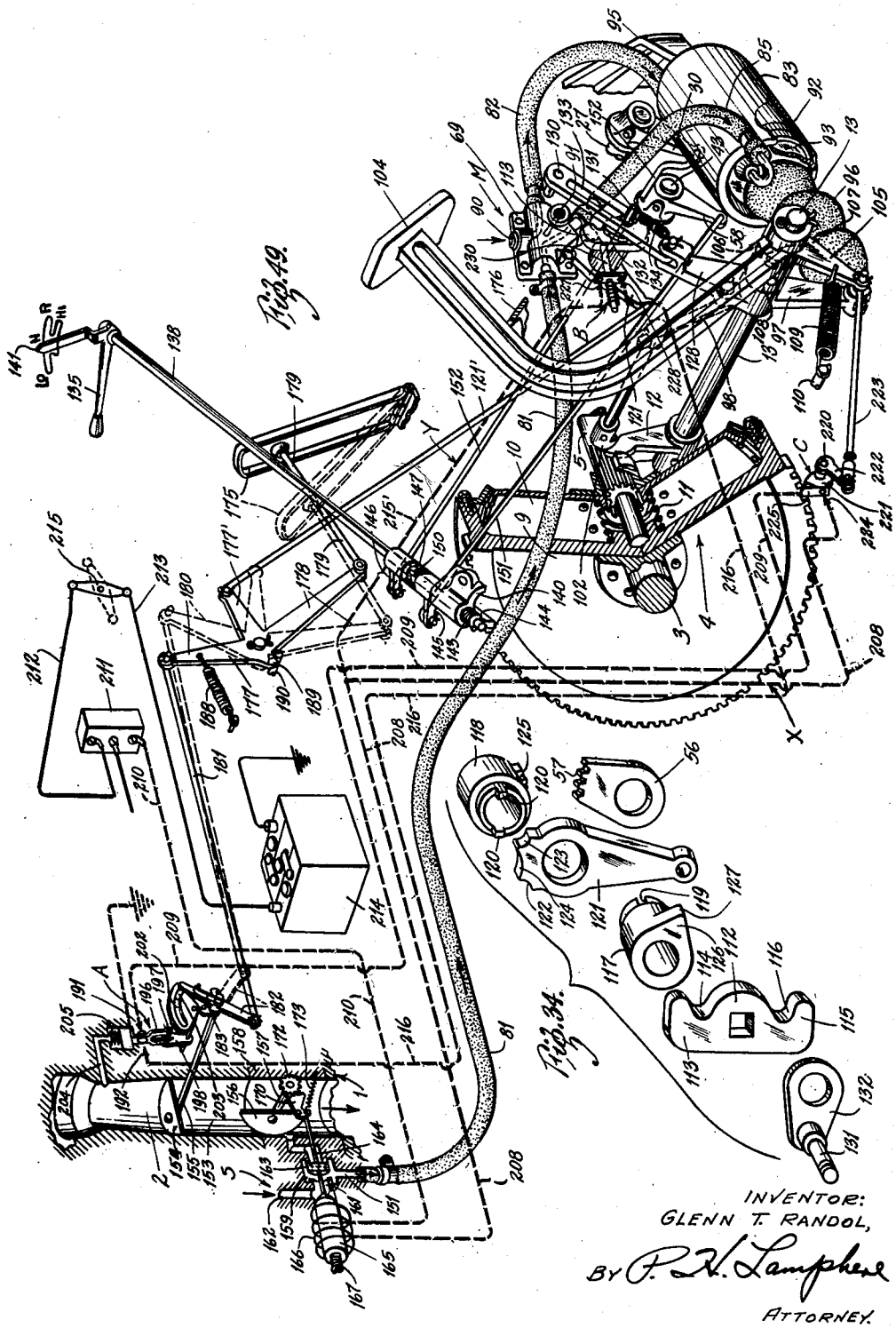

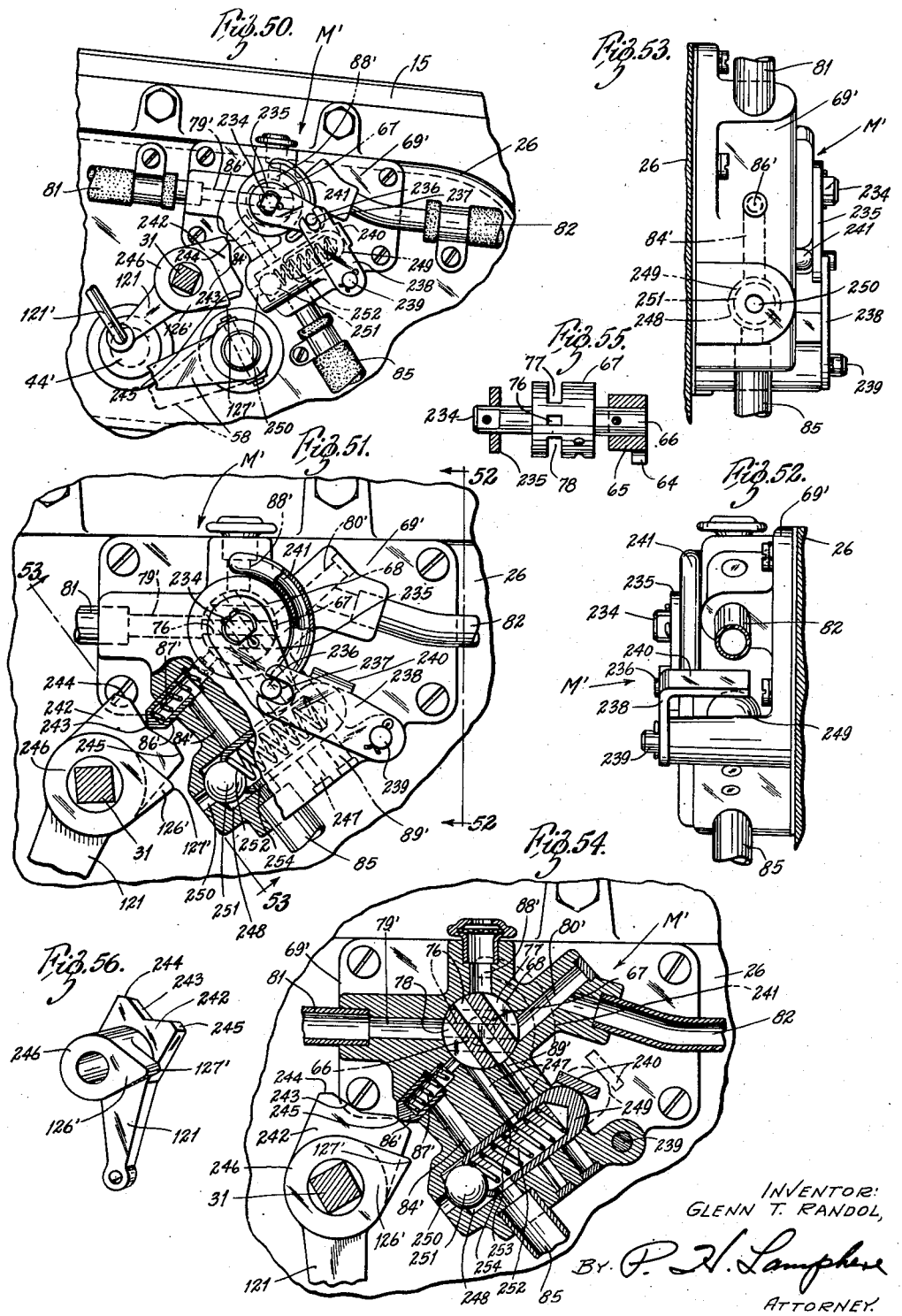

Patented Feb. 10, 1953

2,627,953

UNITED STATES PATENT OFFICE 2,627,953

PEDALLY-CONTROLLED POWER-OPERATED CLUTCH

Glenn T. Randol, Detroit, Mich.

Original application December 10, 1941, Serial No. 422,332, now Reissue Patent No. 23,562, dated October 7, 1952. Divided and this application October 8, 1945, Serial No. 621,086

37 Claims. (Cl. 192—.073)

This invention relates to power-operated clutches, and more particularly to power-controlled clutches for automotive vehicles wherein the conventional personally operated clutch pedal is retained for selective use in a novel manner to either control power-disengagement of the clutch or to directly operate the clutch, independently of, or to assist the power.

This application is a division of my original copending application filed December 10, 1941, under Serial No. 422,332, now matured as Patent Re. 23,562, dated October 7, 1952, for Automotive Power Drive Control System and Mechanism.

One of the objects of the present invention is to provide a power-operated clutch having an operator-operated movable member actuatable after an initial free travel to disengage the clutch, and operable during its free travel to control power clutch disengagement.

Another object is to provide a clutch mechanism having control means personally operable consecutively through an initial range of free travel and a further range of effective travel to actuate the clutch mechanism through the medium of a booster servomotor and a mechanical linkage, respectively.

An additional object of the invention is to provide improved control means for a friction clutch, particularly a clutch which is associated with an automotive vehicle engine and a change-speed transmission and employable to disconnect said engine when the vehicle is stopped or to facilitate gear ratio changing.

A further object is to provide improved power-operated control means for a friction clutch.

The invention seeks, as another object, to provide a vehicle clutch disengaging mechanism, wherein the clutch may be disengaged personally or by power-actuated means, and wherein the usual clutch pedal may, if so desired, be actuated to supplement the power-actuated means in disengaging the clutch.

The invention seeks, as still a further object, to provide a power-operated clutch disengaging mechanism wherein a mere "tapping" or a slight movement of a conventionally operated clutch pedal in its free range of travel will serve to disengage and hold disengaged the clutch of a motor vehicle, thereby reducing the effort for foot manipulation on the part of the driver to a minimum without sacrificing the well known pedal controlling operations.

Another object of the invention is to provide improved means for controlling the disengaging and re-engaging of a friction clutch by manipulation of the accelerator mechanism of an engine with which the clutch is associated.

Still another and more specific object is to provide improved means for controlling a friction clutch by an accelerator mechanism whereby the clutch may be disengaged when the accelerator mechanism is placed in its released engine idling position, and re-engaged by a slight movement of the accelerator mechanism from its released position in an engine accelerating direction.

Yet another object is to provide improved means whereby a friction clutch can be disengaged by moving the accelerator mechanism to a position substantially at its normal full throttle open position.

Still another object is to provide improved fluid pressure servomotor means for operating a friction clutch, together with a control means for the motor which will cause the motor to bring about a proper and smooth clutch reengagement, the control means including means for locking fluid in the motor and controllably releasing the locked fluid at a variable rate.

Yet a further object is to provide a control mechanism for a clutch having a movable engaging and disengaging member and power-operated means energized by a source of power for actuating the member, the mechanism including means for varying the rate of re-engaging movement of the movable member by yieldably locking the power-operated means in operatively connected position relative to the source of power.

Yet a further object is to provide improved control means for a servomotor actuated friction clutch control including valves therefor which are caused to be operated by electrical means including circuits energized and de-energized by switches controllable by predetermined conditions of associated mechanism.

It is still another important object of this invention to provide an improved means for controlling the operation of a fluid booster servomotor operatively connected to a clutch movable member, the means being energized during free travel of the movable member to close an electrical circuit.

A further object is to provide improved power-operated means for controlling a clutch in accordance with certain settings of a personally operated control lever for a change-speed transmission.

A still further object is to provide improved means for so controlling a servo-operated friction clutch by an operator-operatable change-speed transmission control member, that the clutch can be engaged and disengaged at will by a movement of the member when a gear ratio drive is established, and without disturbing the established drive condition of the transmission.

Still another object is provided in a power-operated means for a friction clutch, improved operator controlled means for controllably causing the power-operated means to disengage the clutch when the operator means is moved from one position to another position, and to disable the power-operated means to accommodate automatic re-engagement of the clutch when the operator means is moved back to the one position.

Yet another object is to provide in a friction clutch controlling means, an improved linkage connecting system between the movable clutch element and the actuating member therefor which will produce better and smoother clutch control, particularly smoother clutch engagement.

A still further object is to so construct a lever-connecting system between a movable clutch element of a friction clutch and an actuating member therefor that a high leverage ratio will be present during clutch disengagement, and a low leverage ratio for the clutch return spring to act through will be present during clutch re-engagement, which low ratio will vary proportionately as the clutch assumes full re-engagement.

Other objects of my invention will become apparent from the following description taken in connection with the accompanying drawings, in which:

Figure 1 is a side view of a portion of a motor vehicle showing the engine, the change-speed transmission and the friction clutch operating pedal combined with certain structure to form a clutch control mechanism embodying my invention, the parts being in their normally inoperative positions wherein the clutch is fully engaged and the change-speed transmission is in neutral condition;

Figure 2 is a view taken as indicated by the line 2—2 of Figure 1;

Figure 3 is a view taken as indicated by the line 3—3 of Figure 1;

Figure 4 is an enlarged view of the parts associated with the clutch pedal and mounted on the exterior of the transmission closure plate, said parts being shown in the neutral position with the clutch in engaged condition;

Figure 5 is a view of the parts on the inside of the transmission closure plate showing them in positions corresponding to those on the exterior of said plate, as viewed in Figure 4;

Figure 6 is a view similar to Figure 4 but with the clutch pedal moved to clutch disengaged position and the transmission shifted so that low speed drive is operative;

Figure 13:
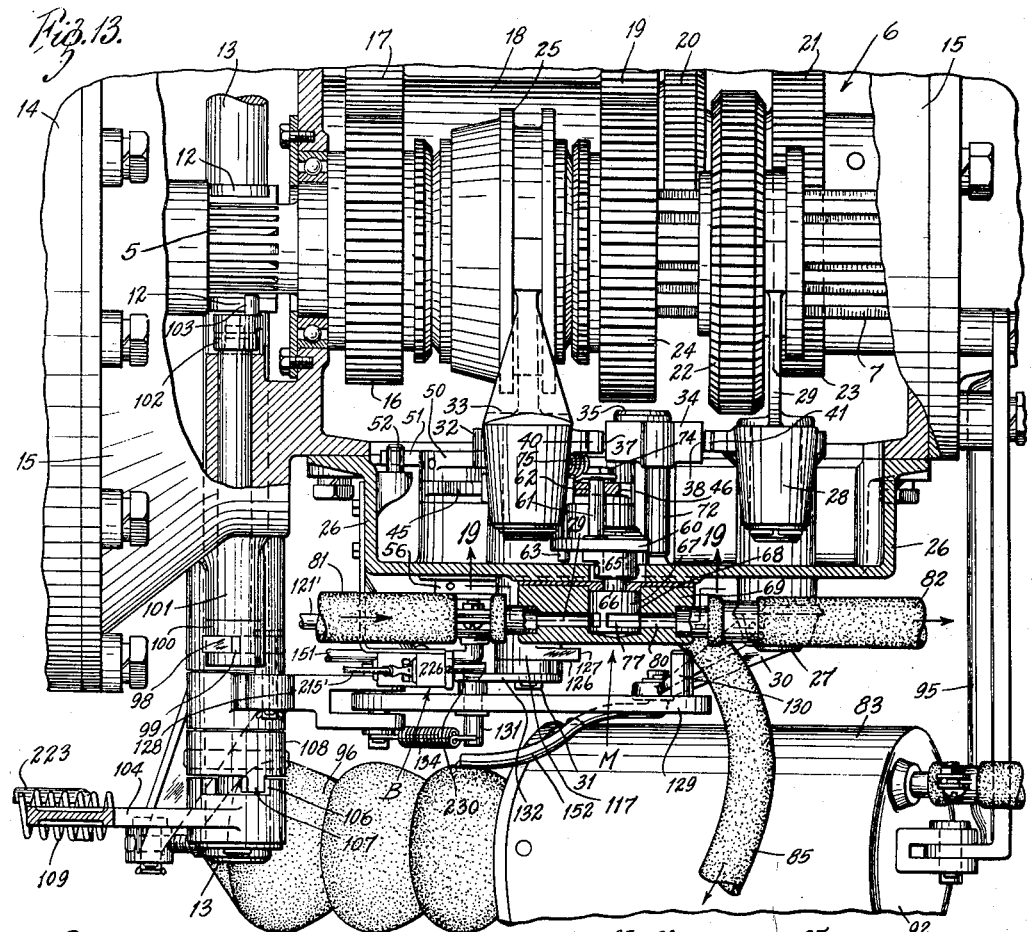
Figure 14:
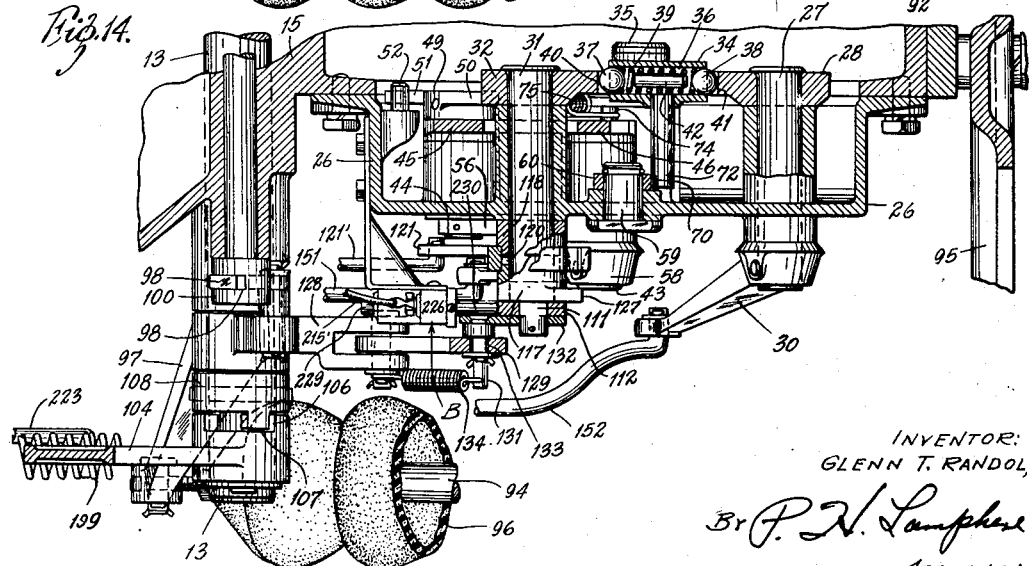

Fiigure 7 is another view similar to Figure 4 but with the parts in the positions assumed when the hand lever is set for automatic operation of intermediate and high speeds, the clutch pedal being in a disengaged position and the speed element in its neutral position;

Figure 8 is a partial view of the parts on the inside of the closure plate showing their positions corresponding to the positions of the parts shown in Figure 7;

Figure 9 is a view similar to Figure 7 but showing the parts in the positions assumed when the second speed ratio has been made operative but prior to re-engagement of the clutch;

Figure 10 is a view of the parts on the inside of the closure plate showing their positions corresponding to the positions of the parts shown in Figure 9;

Figure 11 is another view of the parts on the exterior of the transmission showing the positions assumed when high speed ratio (direct-drive) is made operative but prior to the re-engagement of the clutch;

Figure 12 is a view of the parts on the inside of the closure plate showing said parts in their positions corresponding to the positions of the parts shown in Figure 11;

Figure 13 is a sectional view taken on the line 13—13 of Figure 4;

Figure 14 is a sectional view taken on the line 14—14 of Figure 4;

Figure 15 is a sectional view taken on the line 15—15 of Figure 4;

Figure 16 is a view taken on the line 16—16 of Figure 4;

Figure 17 is a sectional view taken on the line 17—17 of Figure 4;

Figure 18 is a sectional view taken on the line 18—18 of Figure 17;

Figure 19 is an enlarged partial sectional view of the master conditioning control valve and associated restricting valve controlled by the accelerator mechanism, the parts having the positions assumed when the throttle is fully closed;

Figure 20 is a view similar to Figure 19 but showing the parts in the positions they assume when the accelerator pedal is fully depressed;

Figure 21 is a view similar to Figure 20 but showing the parts when the accelerator pedal is initially released from a fully depressed position;

Figure 22 is a view similar to Figure 21 but showing the parts when the accelerator pedal is partially depressed;

Figure 23 is a sectional view through the master conditioning control valve, said view being taken on the line 23—23 of Figure 20;

Figure 24 is a sectional view taken on the line 24—24 of Figure 23;

Figure 25 is a sectional view taken on the line 25—25 of Figure 4;

Figure 26 is a sectional view of the limit switch mounted on the transmission cover and showing the switch in closed position as assumed when the transmission is in either neutral or high speed ratio drive;

Figure 27 is a view similar to Figure 26 but showing the switch open, which condition exists when the gearing is in second speed ratio drive;

Figure 28 is a view taken on the line 28—28 of Figure 26;

Figure 29 is a sectional view taken on the line 29—29 of Figure 27;

Figure 30 is a view of the clutch pedal controlled switch in open condition;

Figure 31 is a view of the clutch pedal controlled switch operated to closed condition;

Figure 32 is a view taken on the line 32—32 of Figure 4;

Figure 33 is an exploded view of the interlocking arm and associated lever and arms mounted on the inside of the closure plate;

Figure 34 is an exploded view of certain parts mounted on the exterior portion of the shaft for controlling the second and high speed shifting fork and rate of clutch engagement.

Figure 34A is a perspective view of other parts employed in neutralizing and controlling the alternate moving of the second and high speed shifting fork;

Figure 35 is a view of the carburetor and associated parts including the solenoid controlled valve for connecting the power cylinder with the inlet passage of the carburetor, the accelerator pedal controlled butterfly valve being in closed position;

Figure 36 is a view similar to Figure 35 but showing the parts in the positions assumed when the accelerator pedal is depressed;

Figure 37 is a view taken on the line 37—37 of Figure 35;

Figure 38 is a view similar to Figure 35 but showing the carburetor butterfly valve in fully open position corresponding to the depression of the accelerator pedal beyond its engine controlling range;

Figure 39 is a view, partly in section, showing the position of the accelerator pedal selector switch when the accelerator is fully depressed;

Figure 40 is a view similar to Figure 39 but showing the movable element of the switch moved upwardly, the position assumed when the engine is so operated that the vacuum can cause said movement;

Figure 41 is a sectional view taken on the line 41—41 of Figure 40;

Figure 42 is an end view of the solenoid-controlled valve;

Figure 43 is a perspective view of the piston and the switch element carried thereby which forms a part of the accelerator pedal selector switch;

Figure 44 is a perspective view of one of the stationary contacts of the accelerator pedal selector switch;

Figure 45 is a schematic view of the clutch and transmission control mechanism illustrated in Figure 1 but operated to establish second speed drive and including the electrical control circuits therefor, said circuits being depicted in solid and broken lines to indicate respectively energized and non-energized conditions thereof;

Figure 46 is a schematic view of a portion of the control structure illustrated in Figure 1, showing in particular the solenoid-controlled valve and the secondary butterfly valve associated with the carburetor, and including the electrical control circuits therefor depicted in solid and broken lines to indicate respectively energized and non-energized conditions thereof;

Figure 47 is a schematic view similar to Figure 45 showing the control mechanism operated to establish high speed drive, and disengage the friction clutch;

Figure 48 is a schematic view similar to Figure 45 showing the control mechanism operated to establish second speed drive as a result of the full depressing movement of the accelerator pedal, said clutch being in disengaged condition;

Figure 49 is another schematic view of the control structure illustrated in Figure 1 including the electrical control circuits therefor, said circuits being depicted in solid and broken lines to indicate respectively energized and non-energized conditions thereof;

Figure 50 is a side view of a portion of the transmission showing a modified construction wherein the selection of the speed ratio is accomplished directly by the accelerator mechanism, the positions of the parts corresponding to a released condition of the accelerator mecha- nism with the hand lever set in "Hi" position;

Figure 51 is an enlarged view of some of the structure shown in Figure 50, the parts being shown in section and their positions corresponding to neutral condition of the gearing;

Figure 52 is a sectional view taken on the line 52—52 of Figure 51;

Figure 53 is a sectional view taken on the line 53—53 of Figure 51;

Figure 54 is a view similar to Figure 51 but showing a complete section, the positions of the parts corresponding to a fully depressed condition of the accelerator mechanism;

Figure 55 is a view of the rotatable element of the master conditioning control valve; and Figure 56 is a perspective view of the selector member which is operated directly by the accelerator mechanism.

*Transmission and clutch mechanism (Figures 1 to 49, inclusive)*

Referring to Figure 1, numeral 1 indicates an internal-combustion engine for a motor vehicle which is provided with the usual carburetor 2. The crankshaft 3 of the engine (see Figures 45, 47, 48 and 49) is connected through a friction clutch 4 to the driving shaft 5 of a change speed gearing 6 illustrated as an example only, and which forms no part of the present invention except that portion of the control system and mechanism thereof utilized in the control of the aforementioned clutch. The driven shaft 7 of this gearing is in turn connected to a propeller shaft 8 for driving the wheels of the vehicle in a well known manner. The friction clutch 4 comprises an element 9 fixed to the end of the crankshaft and a cooperative element 10 slidably mounted on the driving shaft 5 of the gearing. The slidable element 10 is normally held in engagement with element 9 by a spring 11 and is adapted to be disengaged by a fork 12 secured to the inner end of a clutch shaft 13. The friction clutch is enclosed in the housing 14 which is interposed between the engine 1 and the gearing housing 15 (see Figure 1).

As best shown in Figure 13, the change-speed gearing within the housing 15 is of conventional construction and comprises a driving gear 16 secured to the end of the driving shaft 5 projecting into the housing. This gear 16 is in constant mesh with the gear 17 on the countershaft 18 which also has integral therewith a second speed gear 19, a low speed gear 20, and a reverse gear 21. The driven shaft 7 of the gearing is axially aligned with the driving shaft and has its forward end journaled therein. The rear portion of the driven shaft has splined thereon a slidable gear 22 which is adapted to mesh with gear 20 to provide low speed drive and also with the idler gear 23 (constantly in mesh with gear 21) to provide reverse speed drive.

The central portion of the driven shaft 7 has rotatably mounted thereon a second speed gear 24 which is constantly in mesh with the second speed gear 19 on the countershaft. Positioned on the driven shaft between the gears 16 and 24 and rotatable therewith is a slidable double clutch element 25 which, when slid rearwardly, will clutch the second speed gear 24 to the driven shaft and when slid forwardly will clutch the driving shaft 5 directly to the driven shaft to thus obtain second (intermediate) speed drive and high speed drive, respectively. The clutch element 25 and the manner in which it is capable of performing its function is well known in the art and need not be specifically described. It might be mentioned, however, that the cooperating clutch teeth on said element and the gears have associated therewith synchronizing means for enabling the clutch teeth to be smoothly engaged.

The change-speed gearing housing 15 has an opening on one side which is closed by a closure plate 26. On the rear end of this plate there is journaled a shaft 27 (Figure 14) which has secured to its inner end an upstanding arm 28 and journaled in the upper end of this arm is a shifting fork 29 for cooperation with the gear 22 whereby this gear may be shifted forwardly and rearwardly from its neutral position, shown in Figure 13, in order to obtain low and reverse gear drives. The outer end of the shaft 27 has secured thereto an arm 30 whereby the shaft may be rotated from the exterior of the closure plate in a manner to be later described.

Also journaled in the closure plate at a point forwardly of shaft 27 is a second shaft 31 which has secured on its inner end an upstanding arm 32, the upper end of which has pivotally mounted therein a shifting fork 33 for cooperation with the double clutch element 25 to thus shift said clutch rearwardly and forwardly from its central neutral position, as shown in Figure 13, and thus obtain second speed and high speed drives, respectively.

In order to provide an interlocking means for the shifting forks and thus prevent either of them being moved from a neutral position to an operative position when the other is in an operative position, there is mounted on the lower side of the closure plate, an arm 34 pivoted on a shaft 35 and extending upwardly between the arms 28 and 32 (see Figures 13, 14 and 15). This arm 34 is provided with a bore 36 carrying in its ends balls 37 and 38 pressed outwardly by an interposed spring 39. Ball 37 is adapted to cooperate with recesses 40 in the hub of arm 32 to yieldably hold shifter fork 33 in its various positions and the ball 38 is adapted to cooperate with recesses 41 in the hub of arm 28 to yieldably hold shifter fork 29 in its various positions. The balls also have interposed between them a pin 42 which limits their movement toward each other. With this interlocking structure, which is of known construction, when the shifting fork 29 is moved to cause gear 22 to mesh with either of the gears 20 or 23, arm 32 will be prevented from being rotated to move shifting fork 33 from its central position due to the contoured edge of the hub of arm 28 holding the end of the wall of bore 36 seated against two flat surfaces adjacent the central (neutral) recess 40. When the shifting fork 33 is moved in either direction to cause the double clutch element 25 to be in an operative position, the shifting fork 29 will be prevented from moving by the contoured edge of the hub of arm 32 acting on arm 34 to cause the end of the wall of bore 36 to firmly seat against the two flat surfaces adjacent the central (neutral) recess 41.

In addition to the shafts 27 and 31 carried by the closure plate, there are two other shafts 43 and 44 positioned below the shaft 31 and on opposite sides thereof. On the inner end of shaft 44 (see Figures 5, 10 and 12) there is freely mounted a neutralizing lever 45 which extends upwardly to one side of arm 32 on shaft 31. The inner end of shaft 43 has secured thereto a companion neutralizing lever 46 which extends upwardly on the opposite side of arm 32. Lever 46 is shown in perspective in Figure 33. The lever 46 carries an extension 47 which overlies a similar extension 48 on lever 45. Thus, if lever 46 should be moved inwardly from its extreme outer position as shown in Figure 12, lever 45 will not be moved simultaneously inwardly until the gap between the extensions 47 and 48 is closed for purposes to become apparent. However, if lever 46 is moved outwardly from its extreme inner position, lever 45 will not be moved simultaneously therewith.

On the inner end of shaft 44 beyond lever 45 there is pinned thereto a member 49 having a projecting cam portion 50 (see Figure 34A). This member is also provided with an extension 51 for cooperation with a stop 52 on the cover plate where it is normally biased by a spring 53 having one end connected to the member and the other to a pin 54 carried by the backing plate. The cam portion 50 in its normal position is adapted to lie in the path of a cooperating cam portion 55 on the lower side of the hub of arm 32 when said arm is moved to cause the second speed ratio to be operated. Figure 10 shows the cam portion 55 in engagement with the cam portion 50. Under these conditions it is seen that the member 49 is rotated against the bias of spring 53, thus rotating shaft 44. Shaft 44 on its end exterior of the cover plate has secured thereto an arm 56 provided with teeth 57, the purpose of which will become apparent.

The outer end of shaft 43 to which lever 46 is secured has pinned thereto an arm 58 in order that this shaft may be manually operated in a manner to be described to thus cause the lever 46 to be moved away from the shifting fork arm 32 or toward said arm. When lever 46 is moved away from the shifting fork arm, as shown in Figures 10 and 12, lever 45 will not be moved. However, as previously mentioned, if lever 46 is moved toward the shifting fork arm to a position engaging it, then lever 45 will also be moved simultaneously toward the shifting fork arm. If the shifting fork arm should be in an operative position, that is, either second or high speed operative position, then it will be moved inwardly by one of these arms to its neutral position, as shown in Figure 13. Thus there is provided means for neutralizing the gearing if the gearing is in second or high speed since, as will be described later, shaft 43 is manually-operated through arm 58.

Above shaft 43 there is journaled in the cover plate still another shaft 59 which projects only into the interior of the gearing housing. This shaft has freely journaled thereon an arm 60 which extends upwardly along side lever 46 and carries a pin 61 which projects through a slot 62 in said lever 46. Thus it is seen that lever 46 and arm 60 have their free ends movable in unison but said elements rotate about different axes. The arm 60 also carries a second pin 63 (see Figure 33) which projects into an open ended slot 64 in the end of a short arm 65 secured to a pin 66, said pin being carried by a rotatable valve element 67 (see Figures 23 and 25) mounted in a bore 68 of a valve casing 69 secured to the exterior of the closure plate adjacent the top side. The valve comprising the valve element 67 and the casing 69 constitute parts of the main control conditioning valve for the power operated shifting means to be described later, this control conditioning valve being generally designated by the letter M.

Referring again to Figure 33, the previously mentioned arm 60 has its hub portion provided with a recess 70 and on the body of the arm above this recess is a shoulder 71. The recess 70 is adapted to receive a pin 72 carried by arm 34 of the described interlocking structure. Thus, if the interlock member 34 should be moved forwardly, as viewed from the inside of the closure plate (Figures 10 and 12), pin 72 can engage in the recess and prevent arm 60 from being moved. This forms a lock for the valve element 67. When pin 72 is out of recess 70 so as to accommodate movement of arm 60, shoulder 71 will engage the pin and limit the movement of said arm. The lever 46 is also provided with a recess 73 for receiving pin 72 so that said lever can have sufficient movement to move arm 60. A pin 74 is carried by lever 46 to which an over-center spring 75 is connected, said over-center spring assisting to hold lever 46 in its outward position when once placed in said position and assisting in moving the lever inwardly once the lever has been initially moved.

Vacuum-motor control valve

The master control conditioning valve M, previously referred to, is shown in detail in Figures 19 to 25. The cylindrical valve element 67 is provided with a cross passage 76 and parallel surface slots 77 and 78 on opposite sides thereof. The casing 69 is formed with aligned passages 79 and 80 of which the cross passage 76 of the valve element can align to place these passages in communication with each other. Passage 79 is connected by a flexible conduit 81 to the source of suction which in this instance will be the intake of the engine. The other passage 80 is connected to a flexible conduit 82 which communicates with the rear end of a vacuum-operated servomotor 83. The valve casing is also provided with a third passage 84 which enters the bore in the valve casing at an angle to passage 79. This passage 84 is connected by a conduit 85 to the forward end of the servomotor 83. The passage 84 is adapted to be controlled by a small restricting valve element 86 which is normally biased by a spring 87 to such a position that passage 84 will be fully open. If this restricting valve element 86 is moved inwardly, passage 84 will be restricted. The means for controlling the restricting valve element will be described later. The valve casing also has two atmospheric passages 88 and 89, one leading from the top of the bore and the other leading from the lower side of the bore. These passages have associated therewith air filters 90 and 91. A detent 91' cooperates with the recesses in the valve element 67 to hold it in its two positions.

In the valve structure described it is seen that when the valve element 67 is in a position to connect passages 79 and 80, the rear end of the servomotor 83 will be placed in communication with the source of suction. The forward end of the suction motor will be in communication with the atmosphere by way of conduit 85, passage 84, valve element slot 78 and atmospheric passage 89. This position of the valve is shown in Figure 20. The valve element 67 should be turned to the position shown in Figure 19, then it is seen that the forward end of the servomotor 83 will be connected to the conduit leading to the source of suction and the rear end of the motor connected to atmosphere through passage 88. Suction, however, is not available at the forward end of the motor for reasons which will become apparent.

Manual and power hook-up to transmission and clutch

The servo-mechanism 83 comprises a cylinder 92 in which is slidable a piston 93 having a piston rod 94 extending from the forward closed end of the cylinder. The rear end of the cylinder is pivotally mounted on a bracket 95 secured to the end of the gearing housing. The piston rod 94 is enclosed by a dust excluding boot 96 and has its outer end pivotally connected to an arm 97 which is rotatably mounted on the outer end of the clutch shaft 13 extending out of the clutch housing 14. Adjacent the hub of arm 97 is pivotally connected a link 98 which extends upwardly and is slidably received in a slot 99 of a shaft 100 positioned parallel to the clutch shaft 13 and carried by a sleeve 101 secured to the clutch housing (see Figure 17). The inner end of shaft 100 has pinned thereon a collar 102 from which projects a pin 103 positioned off center with respect to the axis of shaft 100. This pin, as shown in Figures 17 and 18, is adapted to engage with the rear side of the upper end of one of the arms of shifting fork 12. Thus it is seen from this structure that if the piston in the power cylinder is moved rearwardly from the forward end, arm 97 will be rotated in a counter-clockwise direction as viewed from the left side of the vehicle, thereby rotating shaft 100 in a clockwise direction and moving link 98 from the position shown in Figure 6 to the position shown in Figure 7. The rotation of shaft 100, although being through only a small angle, will result in pin 103 moving shifting fork 12 to thereby disengage the clutch 4 by moving the slidable element 10 thereof relatively to element 9.

On the outer end of the clutch shaft 13 is loosely mounted the operator-operated clutch pedal 104 which has a downwardly extending arm 105. The hub of this clutch pedal is provided with a shoulder 106 (see Figure 17) which is adapted to cooperate with a lug 107 carried by a collar 108 pinned to the clutch shaft 13 and interposed between the clutch pedal and the hub of arm 97. When the clutch is engaged and the clutch pedal is in its fully released position, shoulder 106 of the clutch pedal is spaced a slight distance from lug 107 on the collar as shown by dotted lines in Figure 4. This spacing of shoulder 106 with respect to lug 107 enables the clutch pedal to have a slight free (lost-motion) forward movement before shoulder 106 and lug 107 engage to cause rotation of the clutch shaft. Whenever it is desired to disengage the clutch, it can be done by merely depressing the clutch pedal and when shoulder 106 engages lug 107, the clutch shaft 13 will be rotated to move the fork 12 so that the clutch will be disengaged. The clutch pedal is held in its clutch engaged position by a spring 109 connected between the downwardly extending arm 105 and a pin 110 on the exterior of the clutch housing.

The outer end of shaft 31, which is employed to move the shifting fork 33, is provided with a squared portion 111 whereby the double arm lever 112 (shown in perspective in Figure 34 together with other related elements) is secured thereto. The upper arm 113 of this lever is provided with a recess 114 and the lower arm 115 is provided with a recess 116. Positioned on the shaft between the double arm lever 112 and the closure plate are two collars 117 and 118, collar 117 being provided with slots 119 for receiving lugs 120 carried by collar 118, thus causing said collars to be connected together for simultaneous rotation on shaft 31. Surrounding these collars at their point of juncture and freely rotatable thereon is an arm 121 provided on its hub with spaced recesses 122 and 123 between which is a curved surface 124. The recesses and the surface are adapted to cooperate with the restricting valve 86 previously referred to which controls the passage 84 leading to the forward end of the suction motor. When the restricting valve is in either recess 122 or 123, the valve will be fully opened. When it is on the ends of the surface 124, the valve element will be closed by seating against a fiber seat. When the arm is moved so that the surface 124 moves under the valve element from either end, the valve will be gradually released to full open restricting position as best shown in Figure 22.

The collar 118 lies just above the arm 56 which, as previously mentioned, is pinned to shaft 44. A portion of this collar is formed with teeth 125 which mesh with the teeth 57 on arm 56. Thus whenever the shaft 44 is rotated collars 118 and 117 will also be rotated thereby. The end of collar 117 which lies adjacent the double arm 112 is formed with a V-shaped cam surface 126 having an apex 127. This V-shaped cam points toward the rear and the apex lies between recesses 114 and 116 on the double arm.

The double arm lever 112 is actuated by the servomotor through arm 97 carried on the clutch shaft 13. The hub of arm 97 is provided with an upwardly extending arm 128 and pivotally connected to its upper end is a link 129. This link has on its free end a pin 130 for engaging in either recess 114 or 116 of the double arm lever thus causing rotation in opposite directions of the double arm lever and the shaft upon which it is mounted. The pin 130 is of such length as to cooperate with the V-shaped cam 126 which will control the guiding of the pin into the recesses. The link 129 is held in the desired position by means of a pin 131 carried by arm 132 freely mounted on the extreme outer end of shaft 31, said pin extending into a slot 133 running longitudinally of link 129. Between pin 131 and the upper end of arm 128 there is interposed a spring 134 which holds arm 132 in alignment with the line of pull of the spring.

It is apparent from the structure just described that if arm 97 should be rotated in a counter-clockwise direction from its inoperative position, as shown in Figure 6, spring 134 will be elongated and link 129 slid forwardly on pin 131. After a predetermined amount of travel of link 129, pin 130 on the extreme end thereof will engage cam 126. If the apex 127 of this cam is above the line of movement of the link, pin 130 will be guided into recess 116 and thus cause rotation of the double arm lever in a clockwise direction to thereby rotate shaft 31 and cause the shifting fork 33 to move clutch element 25 so that the second speed ratio drive is operative. The position of the parts when the second speed ratio is operative is shown in Figure 9. If the apex 127 of the cam 126 is below the line of movement of the link, then pin 130 will be guided into the recess 114 and thus cause the link to rotate the double arm lever in a counter-clockwise direction so as to shift the shifting fork and the clutch associated therewith forwardly so as to cause high speed ratio drive to be operative. The positions of the parts when high speed is operative are shown in Figure 11. The engagement of pin 130 with either of the recesses 114 or 116 of the double arm lever will not take place until after arm 97 has been so moved by the suction motor that the clutch 4 will be disengaged.

*Manually-operated shift and accelerator mechanism*

The arms 30 and 58 which are pinned, respectively, to the outer ends of shafts 27 and 43, are manually actuated by a single handle or lever. This handle 135 is mounted below the steering wheel 136 at the upper end of steering column 137 and secured to the upper end of shaft 138. At its upper end the shaft is journaled in a bracket 139 of the steering column and at its lower end is journaled in a bracket 140 at the base of the steering column. The upper end of shaft 138 carries a pointer 141 which cooperates with an h-slot in a bracket 142 also secured to the steering column on bracket 139 just below the steering wheel. The shaft 138 is capable of slight reciprocable movement and is normally biased to its lower position by a spring 143 interposed between the lower bracket 140 and a washer 144 on the end of the shaft.

The ends of the h-slot are designated by the indicia "Lo," "R" and "Hi" and the central crossover portion is designated by "N." When the pointer 141 is in the cross-over portion of the slot at "N," spring 143 biases shaft 138 downwardly so that the pointer can be moved freely into the end of the slot marked "Hi" (intermediate and high drive range) by merely moving lever 135 upwardly in the plane in which it lies. If it is desired to move the pointer into the ends of the H-slot marked "Lo" or "R." this is accomplished by lifting up on handle 135 to move the shaft upwardly and then moving it up or down as desired.

Mounted on the lower end of shaft 138 between the portions of bracket 140, are two arms 145 and 146 having interposed between their hubs a collar 147. The hubs of arms 145 and 146 are provided with slots 148 and 149, respectively, and for cooperation with these slots is a pin 150 carried by shaft 138. The slots 148 and 149 will be in alignment when shaft 138 is in the position wherein the pointer is opposite the letter "N." The pin 150 will be in slot 148 due to the position of shaft 138 as controlled by the spring 143. Thus it is seen that under these conditions arm 145 is connected to the shaft and it will be rotated by the shaft when the handle is so moved that the pointer enters the "Hi" end of the h-slot. If the shaft is moved upwardly from the position shown in Figure 3, pin 150 will be positioned in slot 149 and arm 146 can then be rotated by handle 135, its direction of rotation depending upon whether the handle is moved into the end of the h-slot marked "Lo" or the end of the h-slot marked "R." The arm 145 is connected by a link 151 to arm 48 carried by shaft 43 on the transmission cover, and arm 146 is connected on a link 152 to arm 30 on the outer end of shaft 27.

From the manually-operated structure just described it will be apparent that when the handle 135 is moved so that pointer 141 is in the "R" end of the h-slot, gear 22 will be moved rearwardly by the shifting fork 29 so that the change-speed gearing will be in reverse drive condition. When the handle 135 is so moved that pointer 141 is in the end of the h-slot marked "Lo," gear 22 will be moved forwardly so as to mesh with gear 20 and thereby place the change-speed gearing in low speed drive. When handle 135 is so moved that the pointer is in the end of the h-slot marked "Hi," shaft 43 will be rotated in a counter-clockwise direction, as viewed from the exterior of the cover plate. This counter-clockwise rotation of shaft 43 will cause the lever 46 pinned thereto on the inside of the closure plate to be moved rearwardly and to the position shown in Figure 12. This movement of the lever will also result in the valve element 67 of the master conditioning control valve M to be moved so as to connect the rear end of the servomotor to the source of suction and thereby cause the piston to be moved to the rear end of its cylinder.

Referring now to the carburetor 2 and the mechanism associated therewith, and particularly to Figures 35 to 44, said carburetor is provided with the usual intake passage 153 with which is associated the primary butterfly throttle valve 154 mounted on pivot pin 155 and a secondary butterfly throttle valve 156 mounted on pivot pin 157. In order that conduit 81 leading to the servomotor may be placed in communication with the engine inlet manifold at a point below the secondary throttle valve, there is provided a solenoid-controlled valve generally indicated by the letter S. This valve comprises a casing 158 having a chamber 159 in constant communication with conduit 81. A passage 160 places chamber 159 in communication with the intake passage 153 and a passage 161 places said chamber in communication with the atmosphere by way of passage 162. Passages 160 and 161 are controlled by a single valve element 163 which is mounted on a stem 164 extending through the passages. This stem is connected to the armature 165 of solenoid 166 contained in a non-metallic housing attached by two cap screws to the casing 158. The cap screws also serve to secure the two solenoid terminals in their correct positions and are properly insulated from casing 158 by non-metallic inserts into which the cap screws are threaded and by the mounting flange of the solenoid housing. A spring 167 normally biases the armature of the solenoid, if said solenoid is de-energized, to a position wherein valve element 163 closes passage 160 and places conduit 81 in communication with the atmosphere through passage 161. When the solenoid is energized, the valve element is moved against the action of the spring to a position wherein passage 161 is cut off and passage 160 opened so that the conduit 81 can communicate with the intake passage 153 of the carburetor.

The stem 164 controls the secondary throttle valve 156 by connecting means in chamber 168 which communicates with the intake passage by holes 168'. The inner end of said stem is provided with an enlarged end 169 for operating a lever 170 pivoted to the wall of chamber 168. This lever is formed with teeth 171 for engaging the teeth of a gear 172 fixed to the end of pivot pin 157 of the secondary throttle valve. A spring 173 is connected to an arm 174 on said pin and biases the throttle valve 156 to a normally full open position, as shown in Figure 36. The secondary throttle valve will only be open when the solenoid is de-energized. When the solenoid is energized, as shown in Figure 35, rod 164 will so operate lever 170 that the throttle valve 156 will be moved to a closed position, as shown in Figure 35. Thus it is seen that when the solenoid-controlled valve S is in such a condition that conduit 81 is in communication with the intake passage, the secondary throttle valve will be closed and thereby insure that the engine will idle and maximum suction effect will be present irrespective of operation of the primary throttle valve 154. Whenever the solenoid is de-energized so as to connect conduit 81 with the atmosphere, the secondary throttle valve 156 will be in full open position and have no effect in controlling the intake passage.

The primary throttle valve 154 is adapted to be actuated by accelerator pedal 175 pivotally mounted on the floorboard 176 in the operator's compartment of the motor vehicle. The connection between the throttle valve and the accelerator pedal comprises a bell-crank lever 177 pivoted on the engine. One of the arms 178 of said lever is connected to the pedal by a rod 179. Another arm 180 is connected by a link 181 to a lever 182 centrally pivoted on the outer end of pin 155 of the primary throttle valve 154. A third arm 177' is connected by a rod 121' to the previously mentioned arm 121 mounted on collars 117 and 118. The lever 182 carries a leaf spring 183 which forms a yieldable connection between pin 155 and the lever. This yieldable connection is such that valve 154 will be moved simultaneously with the lever between its fully closed position and its fully open position. When it reaches either of these positions, leaf spring 183 will yield so that the lever 182 can additionally move relative to the throttle valve 154. The throttle pin has fixed thereto an arm 184 which is provided with spaced shoulders 185 and 186 which cooperate with a fixed stop 187. These shoulders and the stop determine the closed position and open position of the throttle valve. When the shoulder 185 engages stop 187, the throttle valve will be closed as shown in Figure 35. When shoulder 186 engages the stop, the throttle valve will be opened as shown in Figure 38.

The bell-crank lever 177 has associated therewith a spring 188 which normally biases a shoulder 189 on the bell-crank lever against a stop 190. When this stop is engaged by the shoulder, the accelerator pedal will be in its fully released position and the throttle valve will not only be held closed wherein the shoulder engages the stop 187, but lever 182 will be moved beyond the closed position of the throttle valve and the leaf spring 183 flexed, all as shown in Figure 35. When the accelerator pedal is fully depressed, the throttle valve 154 will be fully opened and lever 182 will be moved relatively to the throttle valve as accommodated by the flexing of leaf spring 183. This condition is shown in Figure 38. Thus it is seen that the accelerator pedal is capable of a limited over-travel movement at each end of its normal range of throttle control which movement will not affect the operation of the throttle valve. In other words, the throttle valve will be closed before the accelerator pedal is completely released and the throttle valve will be fully opened before the accelerator pedal is fully depressed.

This limited over-travel movement of the accelerator pedal without operation of the throttle valve is employed to control a double switch which is associated with the carburetor, generally indicated by the letter A and hereinafter referred to as the accelerator pedal selector switch. This selector switch is capable of controlling two circuits and comprises two terminals 191 and 192 extending into a bore 193 in casing 194 mounted on the side of the carburetor above the primary throttle valve 154. These terminals 191 and 192 are insulated from the casing as shown in Figure 36. Within the bore 193 is a piston 195 carrying on its head a downwardly extending flexible conductor element 196 which is adapted to selectively engage with the inner ends of the two terminals, said terminals being spaced apart such a distance that the element 196 can be positioned between them without contacting either one. The free end of the flexible contact element 196 is forked and carries a cross pin 197 adapted to be received between the prongs of the forked end 198 of lever 199 pivotally secured to a shaft 200 extending to the exterior of the bore. Secured to the outer end of this shaft is a plate 201 having an arcuate slot 202 therein. Slot 202 receives pin 203 carried on the upper end of lever 182 which operates the throttle valve 154. The plate 201 is normally held in its central position by contact element 196 carried by piston 195, and when the plate is in this position the slot 202 is of such length and so arranged that the throttle valve 154 may be moved by lever 182 and the accelerator pedal to its fully open or fully closed position without the pin 203 engaging an end of the slot. If, however, the lever 182 is caused to move beyond the closed position of the throttle valve 154 as would be the case if the accelerator pedal is fully released, pin 203 will engage the right hand end (as viewed from the exterior) of the slot 202 and cause a clockwise rotation of the plate and the shaft 200. This will result in contact element 196 being flexed so that it is brought into contact with terminal 191, thus closing a circuit to be later described. If the accelerator pedal should be fully pressed and to a position beyond that required to fully open the throttle valve 154, pin 203 will engage the left hand end of slot 202 and so rotate plate 201 that the flexible contact element 196 will be brought into contact with terminal 192, thereby closing a circuit which will also be later described. This closing of the circuit is shown as taking place when the accelerator pedal is moved to a position beyond full open position of valve 154, but such circuit closing can be accomplished at any point which is substantially near the full open position of valve 154.

The end of bore 193 above piston 195 is connected by a passageway 204 with the intake passage of the carburetor above the throttle valve 154. A spring 205 normally biases piston 195 downwardly and against the inner end of insulation 206 of terminal 192. When the piston is caused to move upwardly against the bias of spring 205, as would be the case if a certain degree of suction were present in the portion of the bore above the piston, the contact element 196 will be raised with the piston, such position being shown in Figure 41. Under these conditions the inner end of the terminal 192 cannot be contacted by the contact element 196 due to the fact that the inner end of said terminal 192 is cut away, as shown at 207 in Figure 44, so that the contact element can move over the top of said terminal. The end of the other terminal 191 is not cut away and it, of course, can be engaged by the contact element in all positions of the piston. Since the carburetor is made of conducting material, contact element 196 will always be connected with ground.

*Electrical circuits and controls*

The solenoid-operated valve S is adapted to be controlled by two circuits which are generally indicated by the circuits X and Y. The circuit X includes a clutch pedal controlled switch C and the portion of the accelerator pedal selector switch A comprising the terminal 191 and the contact element 196. The circuit X, which is best shown in Figure 49, includes a conductor 208 leading from the solenoid to the switch C. A second connector 209 leads from switch C to the terminal 191 of the accelerator selector switch. The other terminal of the solenoid is connected by a conductor 210 to the usual junction box 211 of the automobile ignition system. This junction box is in turn connected in the usual manner by conductors 212 and 213 to battery 214, there being an ignition switch 215 interposed between conductors 212 and 213. Since one terminal of the battery 214 is grounded, as is also the contact element 196 of the selector switch, it is seen that the circuit will be closed and the solenoid energized if the ignition switch is closed, switch C closed, and contact element 196 is in engagement with terminal 191.

The other circuit Y for the solenoid includes a limit switch generally indicated by the letter B and mounted on the forward end of the closure plate. One terminal of this switch B is connected by a conductor 215' to conductor 208 leading to the solenoid. The other terminal of said switch is connected by a conductor 216 with terminal 192 of the accelerator selector switch A. The rest of this circuit from the solenoid to the battery is the same as circuit X and comprises the conductor 210, junction box 211, conductors 212 and 213, and the ignition switch 215. Thus it is seen that if the switch B is closed and contact element 196 is in engagement with terminal 192, the circuit Y will be closed and the solenoid energized.

The clutch pedal controlled switch C, which is mounted on the engine, is shown in detail in Figures 30 and 31. This switch comprises a casing 219 in which is mounted a shaft 220 carrying a cam 221 of non-conducting material. The outer end of the shaft carries an arm 222 which is connected by a link 223 with the previously referred to downwardly extending arm 105 on the clutch pedal. The casing 219 carries a fixed terminal 224 insulated from said casing and connected to conductor 208. The casing also carries a yieldable terminal 225 which lies between cam 221 and the fixed terminal 224, said yieldable terminal being connected to the conductor 209. When the clutch pedal is in its fully released position, which is determined by the pull of spring 109 when the foot is off the pedal, terminals 224 and 225 of the switch C will be disengaged and the switch will be open. If the clutch pedal is depressed slightly within the lost-motion throw thereof, as indicated by the dotted line position shown in Figure 1, cam 221 of the switch will be so moved that the contacts will be closed, thus closing switch C. The cam is so formed that the switch will remain closed when the clutch pedal is moved beyond its lost-motion limit position, indicated in dotted lines as in Figure 1, to operatively disengage the clutch directly thereby. It is only when the clutch pedal is in fully released position that the switch C is open.

The switch B, which forms part of circuit Y and is mounted on the closure plate, is shown in detail in Figures 26 to 29. This switch is adapted to be so mounted as to be actuated by the upper arm 113 of the double arm lever 112 secured to the end of shaft 31 and, as previously described, employed in moving the shifting fork 33. The switch B comprises a casing 226 to which is secured a stationary contact element 227 which has connected thereto conductor 215'. Also secured to the casing is a second stationary contact element 228 which has connected thereto conductor 216. Within the casing are two telescopically arranged elements 229 and 230, the element 229 carrying conductor element 231 which projects on opposite sides thereof for engaging contact elements 227 and 228 to electrically connect conductors 215 and 216. The elements 229 and 230 are supported in the casing for relative sliding movement by having their outer ends extending through the walls of the casing. A spring 232 biases element 229 to the position where contact 231 will be disengaged from contacts 227 and 228, such condition being shown in Figure 27. The element 230 has its outer end in a position to be engaged and actuated by arm 113 of the double arm lever 112. A spring 233 is interposed between the two elements and normally maintains the element 230 biased outwardly. This spring 233 is weaker than spring 232. The arrangement is such that when double arm lever 112 is in a position corresponding to the neutral position of shifting fork 33 or in a position corresponding to high speed operative position, switch B will be closed. The neutral position of the double arm lever 112 is shown in full lines in Figure 26 and the high speed position is shown in the dotted line position of the same figure. When the double arm lever 112 is in a position corresponding to second speed drive, as shown in Figure 27, switch B will be opened under the action of spring 232. Spring 233 will also expand to cause the telescopic element 230 to follow up arm 113 of the double arm lever. When the double arm lever is in its neutral position or high speed condition, spring 233 will be so compressed by the inward movement of the telescopic element 230 that spring 232 will also be compressed sufficiently to place the movable contact element 231 in engagement with the stationary contacts 227 and 228.

*Operation of transmission and clutch*
*(Figures 1 to 49, inclusive)*

In operation my novel pedally-controlled automotive clutch when associated with a change-speed gearing of the general character herein illustrated and described by way of example only, and which forms no part of the present invention except that portion of the control system and structure thereof common to both the clutch and the gearing, is effective to transmit drive-torque to the gearing with the parts in the positions shown in Figures 1, 2, 3, 4, 5, 13 and 49. Under these conditions it is to be noted that the accelerator pedal is in fully released position as is also the clutch pedal. The clutch 4 will, therefore, be engaged and the gearing 5 neutralized. The sliding gear 22 in the gear box will be disengaged from both the gears 20 and 23 and the double clutch element 26 will be at its central position between gears 16 and 24. Thus, although the engine may be driving the gear 16 and the countershaft gears, power cannot be transmitted to the driven shaft 7. The two companion neutralizing levers 45 and 46 will be in their innermost positions adjacent the shifting fork arm 32, such positions being shown in Figure 5. The master conditioning control valve M will be in the position shown in Figure 4 wherein the rear end of the servomotor 83 will be connected to atmosphere and the forward end of the suction motor will be in communication with conduit 81 leading to the engine inlet manifold. The manifold will not be connected to the conduit due to the fact that the solenoid is not energized and valve element 163 is in the position shown in Figure 36. The solenoid is not energized due to the fact that the clutch pedal controlled switch C is open. Thus it is seen that suction is not available at the forward end of the servomotor even though the restricting valve 96 is open. When the gearing is in neutral position, gear-shifting handle 135 and the pointer associated therewith are in the positions shown in Figure 3.

When the change-speed gearing is in neutral and it is desired to place it in reverse gear drive, the clutch pedal 104 is fully depressed to thereby disengage the clutch 4. When this is done, the shoulder 106 on the clutch pedal picks up lug 107 and so rotates the clutch shaft 13 that the shifting fork 12 will perform the clutch disengaging operation. With the clutch disengaged, handle 135 is pulled upwardly and then moved so as to place the pointer 141 in the end of the h-slot marked "R." This will cause arm 146 at the bottom of the steering column to be connected to shaft 138 and so rotated that the shifting fork 29 will move gear 22 rearwardly into mesh with the idler gear 23. When the clutch pedal is now released, the vehicle will drive in reverse drive. It is to be noted that during the depressing of the clutch pedal, switch C will be closed, thus closing circuit X (contact element 196 being in engagement with terminal 191 due to the accelerator pedal being in fully released position). Although the solenoid S is energized and valve element 163 moved to such a position that conduit 81 will be in communication with the intake passage, the servomotor 83 will not be operated since the control conditioning valve M interposed in the conduit 81 between valve element 163 and the servomotor is closed. It is also to be noted that the depressing of the clutch pedal to disengage the clutch does not cause any movement of the piston of the motor.

When it is desired to place the gearing in low speed drive, the clutch pedal is again depressed fully, thereby disengaging the clutch. The handle 135 is then manipulated to place the pointer in the end of the h-slot marked "Lo." This will result in shifting fork 29 moving gear 22 into mesh with gear 20. (If reverse drive has previously been operative it will be made inoperative by the moving of handle 135.) When the clutch pedal is released, the vehicle may be driven forwardly with low speed operative by depressing the accelerator pedal in the usual manner.

To obtain second (intermediate) speed drive, the clutch is again disengaged by fully depressing the clutch pedal. Next, the handle 135 is moved to place the pointer 141 in the end of the h-slot marked "Hi." (If the gearing is in low speed drive, this movement of the handle will first cause disengagement of gear 22 from gear 20.) When the pointer is opposite the cross-over portion of the slot marked "N," shaft 138 will be pulled downwardly by spring 143 to thereby cause it to be connected with arm 145. As pointer 141 is moved into the end of the h-slot marked "Hi," arm 145 will be so rotated as to cause shaft 43 journaled in the closure plate to have a clockwise rotation, as viewed from the exterior of the closure plate. This rotation of shaft 43 will cause lever 46 within the closure plate to be swung rearwardly to the position shown in Figure 8. The neutralizing lever 45 will not be moved. Final rearward movement of lever 46 beyond its gear ratio neutralizing range of movement will also cause lever 60 to be rotated therewith and due to its connection with valve element 67 of the master conditioning control valve M by means of arm 65, this valve element will be placed in the position shown in full lines in Figures 20, 21, and 22. This position of the valve element will result in the rear end of the servomotor being connected to the intake passage and the source of suction. As already noted, the depressing of the clutch pedal will close switch C, thereby closing the circuit X and causing the solenoid-controlled valve to be in the position shown in Figure 37 wherein conduit 84 communicates with the intake passage. The forward end of the servomotor will be connected to atmosphere through the open restricting valve 86. Thus it is seen that the piston of the servomotor will be moved rearwardly by the differential pressure acting thereon.

When the movement of the piston of the suction motor 83 reaches a predetermined point toward the end of the cylinder which is substantially two-thirds of the length of the cylinder, arm 97 will be so rotated that arm 128 extending upwardly therefrom will have moved the link 129 to the position wherein shown in Figure 7. This will bring pin 130 on the end of said link 129 to the position wherein it is about to contact the V-shaped cam 126. This cam will be in the position shown in Figure 7 so that the apex 127 lies above the path of the line of movement of the pin. The reason that the cam is in this position is that shaft 44 normally rests in the position shown in Figure 5 when the gearing is in either neutral position or in low or reverse position. Under these conditions arm 32 which carries the shifting fork 33 is in neutral position.

It is to be noted that the position of the V-shaped cam 126 is controlled by the position of shaft 44 due to its geared connection thereto through arm 52 and the cooperating teeth thereon and on the collar 118, which collar is connected to the collar 117 having the V-shaped cam. Thus, with the V-shaped cam in the position shown in Figure 4, the continued movement of the piston of the servomotor to the end of the cylinder will result in the pin on link 129 being guided into recess 116 of the double arm lever 112 and thereby connected to arm 115 of said double arm lever. The double arm lever will be given a clockwise rotation, thereby rotating shaft 31 and causing the shifting fork 33 to move the double clutch element 25 rearwardly and cause the second speed gear 24 to be clutched to the driven shaft. The gearing will thus be in second speed drive.

As shaft 31 is rotated to move the shifting fork 33, arm 32 on said shaft (which arm carries the shifting fork) will be moved rearwardly from its neutral position shown in Figure 8 to a position shown in Figure 10. The movement of arm 32 will cause cam 55 at the bottom thereof to contact cam 50 carried by the member 49 on shaft 44 and thereby rotate said shaft 44 in a clockwise direction, as viewed in Figure 8 from inside the closure plate, and to the position shown in Figure 10. The rotation of shaft 44 will, by means of arm 56 and gear teeth 57 and 125, cause such a clockwise rotation (as viewed from the exterior of the closure plate) of collar 117 and V-shaped cam 126 that its apex 127 will lie below the path of movement of pin 130 on the end of link 129. The positions of the parts on the exterior of the closure cover after the shift to second speed ratio has been made are shown in Figure 9, said clutch still being in disengaged position.

If the foot is now removed from the clutch pedal and the accelerator slightly depressed, the clutch will be automatically re-engaged and with the proper smoothness. The removal of the foot from the clutch pedal will release the pedal to assume its fully released position without the clutch 4 becoming engaged. When the clutch pedal is fully released, the switch C will be open and the circuit X broken. The solenoid will thus be de-energized and the forward end of the servomotor caused to be connected to the atmosphere as a result of the solenoid-controlled valve element 163 assuming the position shown in Figure 36. This is brought about as follows:

It is to be noted that when the accelerator pedal is in fully released position, arm 121, freely rotatable on shaft 31, is in the position shown in Figure 1 and also as shown in Figure 19. The restricting valve 86, which is controlled by the lever, is in full open position. As the accelerator pedal is depressed, the circuit X will be broken and the solenoid valve S operated to connect the suction motor to atmosphere. This same depressing of the accelerator will also cause arm 121 to be moved and the end of the restricting valve 86 will be pushed out of recess 122 and onto the surface 124, thus causing the restricting valve to assume closed position against its fiber seat. Since the forward end of the servomotor 83 has been connected to atmosphere through passage 89 and air filter 91 by the opening of the conditioning valve M, the closing of this restricting valve will result in the air which is in the forward end of the servomotor 83 to be trapped and then as the accelerator pedal is continued to be depressed to be slowly bled to the atmosphere due to the opening of the restriction caused by said valve. Thus the piston of the servomotor will be pulled slowly forward by the action of the clutch engaging spring 11 so that the elements of the clutch will be smoothly engaged. The movement of the piston of the servomotor controls the re-engagement of the clutch and this re-engagement is effected through the link 98 and shaft 100 which is parallel to the clutch shaft 13. Due to the leverage arrangement shown, the clutch engaging spring 11 must first act through a very low leverage to pull the piston of the servomotor toward the forward end of the cylinder. It is to be noted by reference to Figure 17 that this clutch engaging spring must act through the short arm between pin 103 and the axis of shaft 100 and also through the short arm between the pivoted connection of link 98 and the axis of arm 97. This leverage, however, results in the reverse condition when the piston 93 disengages the clutch 4. When the clutch becomes fully engaged, the vehicle will be moving forward in second speed drive.

When it is desired to place the change-speed gear in high speed drive, all that is necessary to be done is to fully release the accelerator pedal 175 and to slightly depress the clutch pedal in its free range of travel to the extent of its lost-motion travel only, as shown in dotted lines in Figure 1. It will not be necessary to do anything with the gear shift handle 135 as it will remain in the position wherein the pointer is in the end of the h-slot marked "Hi." When the accelerator pedal is fully released, the yieldable contact element 196 of the selector valve A will engage the terminal 191, and the above mentioned slight depressing of the clutch pedal will close the switch C. Thus circuit X will now be closed and the solenoid energized so as to cause the control valve element 163 to be moved to the position shown in Figure 35. The rear end of the servomotor will thus be connected to the intake passage and piston 93 thereof moved to the rear end of the cylinder. The movement of the piston over substantially two-thirds of the length of the cylinder will result in disengagement of the clutch by means of arm 97, link 98, shaft 100 and the eccentric pin 103 which cooperates with the rear side of one of the arms of the clutch fork 12.

As soon as the friction clutch 4 is disengaged, pin 130 of link 129 will be moved into engagement with the V-shaped cam 126 and since the apex thereof is below the path of movement of the pin, as shown in Figure 9, the pin will be cammed into the recess 114 and engage with arm 113 of the double arm lever 112. Continued movement of the servomotor piston to the rear end of the cylinder will rotate shaft 31 and cause the shifting fork 33 to move the double clutch element 25 from the position wherein the gear 24 is clutched to the driven shaft 7 to the position wherein the driven shaft is directly connected to the driving shaft 5. This will place the change-speed gearing in high speed drive. The movement of the shifting fork 33 to the position shown in Figure 12 will result in cam 55 on the bottom of said arm 32 to be moved away from cam 50, thus releasing spring 53 to rotate shaft 44 in a counterclockwise direction, as viewed from the inside of the cover plate (Figure 12) in order to reset the V-shaped cam 126 on shaft 31 so that the apex 127 lies above the normal line of travel of pin 130 on the end of link 129. The position of the cam 126 is shown in Figure 11, wherein the clutch 4 has been disengaged and the high speed has just been caused to be operative as a result of the movement of the piston of the servomotor to the rear end of the cylinder.

When the foot is removed from the clutch pedal, so that it can assume fully released position, and the accelerator is depressed, the clutch 4 will be engaged in the same manner as previously described in connection with obtaining second speed drive. Release of the clutch pedal will open the switch C, thereby breaking the circuit X and depressing of the accelerator pedal will speed up the engine and cause a smooth engagement of the clutch 4 by a slow return of the piston of the servomotor to the forward end of its cylinder.

With the change-speed gearing in high speed drive, the apex of cam 126 will be so positioned that if the motor is again operated, the change-speed gearing will be shifted from high speed back to second speed. If second speed is desired, all that need be done is to release the accelerator pedal and slightly depress the clutch pedal in its lost-motion movement. This will cause a shift to be made back to second speed. Release of the clutch pedal 104 and depressing of the accelerator pedal 175 will re-engage the clutch 4 and the vehicle can then be driven in the second speed drive. To reactivate high speed drive, the same procedure is carried out. Thus it is seen that when the gear-shift lever has once been placed so that the pointer is in the end marked "Hi" of the h-slot. Second and high speed drives may be alternately obtained at will by energizing the servo-mechanism, without the necessity of moving the gear-shift handle 135. All that need be done to make a shift is to release the accelerator pedal and slightly depress the clutch pedal and then remove the foot from said pedal.

If the car should be brought to a stop when the change-speed gearing is in high speed gear and it is desired to proceed in second speed gear, second speed will automatically be operative to transmit power as soon as the clutch pedal is released. When the vehicle is brought to a stop, it is only necessary to depress the clutch pedal a small amount in its free-travel in order to power disengage the clutch 4.

In addition to being able to change the gearing from high speed drive to second speed drive by releasing the accelerator pedal and slightly depressing the clutch pedal within its free range of movement, and then releasing it, this shift may be accomplished solely by fully depressing the accelerator pedal. When this is done, the contact element 196 will be caused to engage terminal 192, thus closing the circuit Y. It is to be noted that when the gearing is in high speed, the double arm lever 112 is in such position that the limit switch B mounted on the closure plate is closed. The closing of the circuit Y energizes the solenoid and so operates the control valve S that the rear end of the servomotor will be placed in communication with the engine inlet-manifold and the piston operated. The movement of the piston of the motor to the rear end of the cylinder first disengages the clutch 4 and then operates the double arm lever so as to shift the double clutch element 25 from the high speed operative position to the second speed operative position.

The operation of the solenoid 166 to place the control valve element 163 in the position shown in Figure 35, also results in the secondary butterfly valve 56 being closed at either extreme position of the accelerator pedal. Therefore, it is seen that the intake passage is closed, notwithstanding the fact that the primary butterfly valve 154 controlled by the accelerator pedal is in open or closed idling position due to the fact that the accelerator pedal has been fully depressed or released, respectively. Release of the accelerator pedal will now cause the circuit Y to be broken by a movement of the contact element 196 out of engagement with terminal 192. As soon as this circuit is broken, the solenoid will be de-energized and both ends of the suction motor connected to atmosphere. The clutch 4 will then become re-engaged under the action of its engaging spring 11. When the accelerator pedal is fully depressed, lever 121, which controls the restricting valve 86, will be in the position shown in Figure 20. The restricting valve is thus in open position. When the accelerator pedal is initially released, the restricting valve will be closed as shown in Figure 21. Further release of the accelerator pedal places the restricting valve in the position shown in Figure 22. Thus it is seen that during the release of the accelerator pedal the conduit through which the air in the servomotor is forced to atmosphere is restricted, thereby slowing up the clutch engaging movement of the piston so as to cause a smooth engagement of the clutch. The control of the restricting valve is the same as when the accelerator pedal is moved from its fully released position.

The ability to cause a kickdown shifting operation as just described from high speed to second speed drive by fully depressing the accelerator pedal is very advantageous when it is desired to make a "quick-shift" to second speed in climbing a hill or in passing another vehicle. It is also very convenient in obtaining second speed whenever it is desired. For example, if the vehicle is brought to a stop in second speed drive and it is desired to start again in this same drive, this can be done by fully depressing the accelerator pedal. If this were not done, the shift would be made to high speed upon release of the clutch pedal which, of course, would not be the drive desired.

The shifting of the change-speed gearing from high speed to second speed drive by fully depressing the accelerator pedal can only be accomplished when the speed of the vehicle is below a predetermined speed such as, for example, 35 or 40 miles per hour. This limitation on such method of shifting is accomplished by means of piston 195 upon which the contact element 196 of the selector switch A is mounted. The piston 195 will be moved upwardly when the throttle valve opening and the speed of the engine are such that the velocity of the carbureted mixture through the intake passage will create a sufficient sub-atmospheric pressure in the upper end of the bore that a differential fluid pressure will be acting on the piston to move it in said upwardly direction. The differential fluid pressure to create the movement must be great enough to overcome the bias of the spring 204. Figure 36 shows the piston in its lower position and Figure 40 shows it in the upper position. When the piston is in the upper position the contact element 196 cannot engage the terminal 192 and, therefore, irrespective of whether or not the accelerator pedal is fully depressd the circuit Y cannot be closed and thus no shift can be made. By putting this limitation on the ability to down shift to second speed drive by fully depressing the accelerator pedal, there is no likelihood of damaging the gearing by making a shift to second speed during vehicular speed above a certain value, as, for example, 40 to 45 miles per hour.

When it is desired to neutralize the change-speed gearing after driving the vehicle in either second or high speed drives, all that need be done is to fully depress the clutch pedal 104 by the foot so as to hold the clutch 4 disengaged and then to move the gear-shift handle 135 to a position wherein the pointer 141 is opposite "N." This positively neutralizes the effective transmission drive by manual effort. When the handle 135 moves so that the pointer 141 is at "N," the shaft 43 will be rotated in a counter-clockwise direction, as viewed from the exterior of the closure plate. This will result in the neutralizing lever 46 being initially moved towards neutralizing lever 45 until the extension 47 on lever 46 engages the extension on lever 45 (see Figure 12), following which both levers 45 and 46 will move simultaneously toward each other to neutralize either second or high speed ratio to correspond with the setting of the pointer 141 at "N." When the neutralizing levers are moved simultaneously toward each other as aforesaid, arm 32 carrying the shifting fork 33 will be moved to its neutral position and thereby place the double clutch element 25 in its disengaged position. Regardless of whether the clutch element 25 is in high speed position or second speed drive position, it will be returned to its central neutral position by the companion neutralizing levers 45—46. The movement of these neutralizing levers toward each other will be assisted by the action of spring 75 as soon as lever 46 has been moved sufficiently that the spring is "over center." When lever 46 is initially moved inwardly, valve element 67 of the main control valve M will be moved to the position shown in Figure 4 to thereby connect the rear end of the suction motor to atmosphere and the forward end to conduit 81 leading to the intake manifold. This cutting off takes place prior to any "picking up" and moving of the gear shifting fork 33 toward neutral position by manual effort. Also, the return of levers 46 and 45 to neutral position, as shown in Figure 5, will cause cam 126 to be so positioned, if not already in such position, that the apex thereof will lie above the path of travel of pin 130 so that whenever the gear shift handle is again set that the pointer is in the "Hi" end of the h-slot, the speed drive which will be obtained will be second or intermediate.

*Modified vacuum-motor control valve and operation (Figures 50 to 56, inclusive)*

With respect to the connecting lever arrangement between the piston of the suction motor and the movable clutch element 10 which is acted upon by the spring 11 to cause clutch engagement, it is to be particularly noted that during clutch disengagement a high leverage ratio will be present as the arm 97 is rotated in a counter-clockwise direction as viewed from the left side of the vehicle. The arm 97 carries on its hub the short arm, which will act through the link 98 to rotate the shaft 100, and this shaft will then operate through the collar 102 carrying the eccentrically positioned pin 103. As the clutch reaches full disengagement, as shown in Figure 7, there will be a considerable angle between the link 98 and the short arm on the hub of the arm 97 to which the link is connected.

During re-engagement of the clutch, that is, during the movement of the piston of the suction motor from the position shown in Figure 7 to the position shown in Figure 6, the re-engaging spring 11 of the clutch will have to operate through a low leverage ratio in moving the piston of the suction motor and, consequently, the action of the spring will be considerably "softened" to produce smooth re-engagement of the friction surfaces of the clutch. The low leverage ratio, through which the spring must act in moving the piston, will be the lowest when the clutch is initially allowed to start its engaging movement. Under these conditions, as can be best seen in Figure 7, the angle between the link 98 and the short arm on the hub of the lever 97 to which it is pivoted is at a minimum. As the clutch continues to re-engage, this angle will increase and as a result the low leverage ratio through which the spring acts to move the piston of the suction motor and cause clutch engagement will then begin to increase and will reach its greatest value when the angle is 130 degrees, at which time the clutch will be approximately fully engaged.

It will also be noted that when the valve element 67 of the master control valve M is moved to cut-off position during manual neutralizing of any speed ratio, the forward end of the power cylinder 83 will be connected to the engine intake manifold since it is to be noted that the circuit X is closed, due to release of the accelerator pedal and full depression of the clutch pedal. The piston of the suction motor will thus be pulled forwardly to its normal position assumed when the clutch 4 is engaged, notwithstanding that the clutch 4 remains disengaged due to the depressed condition of the clutch pedal. When the clutch pedal 104 is released by the foot, after obtaining neutralization by movement of the handle 135 to "N" position, the clutch 4 will engage automatically. Thus, it is seen that if the gearing is neutralized, as set forth, there is no possibility of leaving the vehicle with the clutch 4 disengaged and the gearing engaged. The operations performed are identical to manual operations already implanted in the driving public's mind by years of controlling standardized manually actuated gearing and clutches. This is a very important feature since in some power-operated clutches and shifting mechanisms it is possible for the operator not to obtain, by performing the usual manual operations, neutralization of the gearing or the relieving of the power from the power cylinder so that the vehicle clutch will be engaged when he leaves the vehicle.

Referring now to the modified control means whereby the selection of the second speed and the high speed drive is determined directly by the position of the accelerator mechanism, similar parts to those already described are designated by similar reference characters. The main control conditioning valve is designated by the letter M' and is enclosed within a casing 69' mounted on the top portion of the closure plate 26. This casing is provided with bore 68 within which is positioned the control valve element 67 of a construction identical with that of the previously described main conditioning control valve M and being provided with cross passage 76 and the parallel surface slots 77 and 78 on opposite sides thereof. The valve element 67 is carried on stem 66 which extends into the inside of the closure plate and is actuated by means of the short arm 65 through a mechanism which has already been described. The valve element 67 is shown in detail in Figure 55. In the modified construction the valve element is provided with a second stem 234 which extends from the exterior of the end of bore 68 so as to project out of the casing. On the end of this stem 234 is an arm 235 which carries a pin 236 on its free end which engages in slot 237 of lever 238 pivotally mounted on casing 69' by a pin 239. The lever 238 carries an extension 240 which projects toward the closure cover for controlling structure which will be later referred to.

The bore 68 in the valve casing is connected to conduit 81 leading to the suction manifold by passage 79' and to conduit 82 leading to the rear end of the combined clutch actuating and gear shifting servomotor 83 by way of a passage 80' in the valve casing. The valve casing has atmospheric passages 88' and 89', passage 89' being connected with passage 88' by a short pipe 241 (Figure 51). The conduit 85 leading from the forward end of the suction motor 83 is connected to bore 68 of the valve element by a passage 84'.

Associated with passage 84' is a restricting valve 86' normally biased to an open position by a spring 87'. This restricting valve is similar to the restricting valve 86 previously described in connection with the gear shifting structure shown in Figures 1 to 49 but is provided with a V-shaped end instead of a round end. This restricting valve is adapted to cooperate with a cam 242 on arm 121 which is operatively connected to the accelerator mechanism by rod 121' in the same manner as arm 121 of the structure shown in Figures 1 to 49. The cam 242 is provided with a V-shaped recess 243 and end surfaces 244 and 245 which are struck on a radius so that the shaft 31 is at the center, said shaft being the same one upon which arm 121 is rotatably mounted. The arm 121 has integral therewith a collar 246 which is provided with a V-shaped cam 126', said cam taking the place of the V-shaped cam 126 in the previously described shifting mechanism and performs the selecting function for determining to which arm of the double arm lever 112 the pin 130 will be connected when the servo-mechanism is operated toward clutch disengaged position. The V-shaped cam 126' has an apex 127'.

The valve casing is also provided with a passage 247 which communicates with valve bore 68 and is parallel with and lies between passages 84' and 89' (see Figure 54). Intersecting passages 89', 247, and 84' is a bore 248 in which is mounted a hollow plunger 249. The lower end of the bore is provided with an opening 250 leading to atmosphere. Cooperating with this opening is a ball check valve 251. Interposed between the ball check valve and the plunger and lying within the plunger is a spring 252 for biasing the ball check valve to a position closing the opening 250. The upper end of the plunger which projects out of bore 248 is adapted to lie beneath the extension 240 on lever 238, previously referred to, so as to be controlled by said lever. This extension, by means of the lever, can push the plunger 249 inwardly and cause it to engage the check ball 251 and positively hold it on its seat and at the same time connect the engine intake manifold through valve slot 78, passage 247 and ports 253 and 254 to the forward end of the suction motor whereby special operating advantages result, as will be described. This condition is shown in Figure 54. When the extension 240 is moved away from the end of plunger 249 to the dotted line position shown in Figure 54, or in full lines in Figure 50, spring 252 can cause the plunger to follow the extension and under such conditions the spring only will hold ball 251 on its seat to close opening 250. Under such conditions air can flow past the ball from the atmosphere but not in the opposite direction. When the plunger is in engagement with the ball and holding it on its seat, it will be impossible for air to flow in either direction through opening 250. The plunger 249 is provided with an opening 253 in its wall so as to place the passage 247 in communication with the interior of the plunger when the plunger is engaged with the check ball 251. The plunger is also provided with a second opening 254 in its wall for placing conduit 85 in communication with the interior of the plunger when the plunger is held in a position to engage the check ball.

When the structure shown in Figures 50 to 56 inclusively is embodied in the control mechanism, it will not be necessary to employ cam portion 55, cam portion 50, member 49, and extension 51 thereon, and spring 53, all as shown in Figure 5 previously described. The lever 45 of the companion levers 45 and 46 is loosely mounted on pin 44', as shown in Figure 50, which takes the place of shaft 44 of the previously described structure. The arm 56 mounted on the exterior of shaft 44, and collars 117 and 118 mounted on the exterior of shaft 31, are also eliminated when the structure shown in Figures 50 and 56 is employed since the selecting cam 126' is directly actuated by the accelerator mechanism. When the structure of Figures 50 to 56 is employed in the gear shifting mechanism, limit switch B will also be eliminated from circuit Y.

The control valve element 67 in the structure shown in Figure 55 will be in the full line position shown in Figure 54 when the gear-shift handle is in the neutral position or being employed to manually engage either low speed or reverse speed drive. When the gear shifting handle is moved to the "Hi" position, the valve element 67 will assume the dotted line position shown in Figures 50 and 54 by the operation of structure already described in connection with the control mechanism shown in Figures 1 to 49. The opening of the valve element 67 will occur after the neutralizing lever 46 is moved to a position beyond the position wherein it is effective to initiate neutralization, all as previously described.

When valve element 67 is in the position shown in full lines in Figure 54, the rear end of the servomotor will be connected to atmosphere and the forward end of said motor will be connected with conduit 81, the connection being by way of conduit 85, the openings 254 and 253 in the plunger and the passage 247 leading to the bore of the valve element and then through the slot 78. This communication is present regardless of the condition of the restricting valve 86' which restricting valve will be closed either when the accelerator is in the fully released position or in a depressed position substantially at full operating range of the accelerator mechanism. Even though the accelerator mechanism may be released so as to open the solenoid-controlled valve S and place the forward end of the servomotor in communication with the manifold, the motor will not be operated due to the fact that the piston thereof is already in the forward end of its cylinder.

When the control valve element 67 is moved to the dotted line position shown in Figure 54, the rear end of the servomotor will be placed in communication with conduit 81 leading to the manifold by way of the solenoid-controlled valve S. This condition of the control valve element is shown in Figure 50. The lever 238 will be turned to a position so that the plunger 249 will be moved away from the check ball 251 by spring 252. If the accelerator mechanism should be in released engine idling position, then under these conditions arm 121 will be in the position shown in Figure 50. This will result in conduit 81 being connected to the engine intake manifold if the solenoid 166 is energized by slightly depressing the clutch pedal to close switch C. The servomotor will now be operated so as to move the piston from the forward end of the cylinder to the rear end. The clutch will be disengaged and the link 129 moved forwardly so that pin 130 thereof will engage the V-shaped selector cam 126'. This cam is in such position that the apex 127' will lie below pin 130 and thus the pin will be cammed upwardly so as to engage the arm 113 of the double arm lever 112 to thereby cause a shift to high speed position. Air will be admitted to the forward end of the servomotor during the rearward travel of the piston by way of opening 250 and the check-ball since the only thing holding this ball seated is light spring 252. Consequently with the check-ball valve arrangement the clutch can be rapidly disengaged as air can enter the forward end of the cylinder through a free flow passage and not through a restricted passage as is the condition in the previously described structure shown in Figures 19 to 22 where air going to the forward end of the cylinder must pass through the small port having the seat for restricting valve 86. The restricting valve 86' will be closed and air cannot pass said valve because the accelerator is in released position.

If the accelerator pedal is now depressed, the circuit X controlling solenoid valve S will be broken and the clutch caused to engage. The engaging movement of the clutch can be controlled by the extent of opening of the restricting valve 86', said opening depending upon the amount the accelerator pedal is depressed. As the accelerator pedal is depressed, the V-shaped recess 243 will be moved so that the restricting valve can slowly open. Thus the air in the forward end of the cylinder will be bled off and the rapidity of engagement of the clutch controlled.

If a rapid engagement of the clutch is desired, the accelerator pedal will be depressed quickly. If a slow engagement of the clutch is desired, the accelerator pedal will accordingly be slowly depressed. Air cannot escape through opening 250 due to the fact that the check-ball will prevent this.

If second speed drive should be desired instead of high speed, the clutch pedal will not be slightly depressed but instead thereof the accelerator pedal will be fully depressed to a position substantially at the end of its operating range, as shown in Figure 54. This will cause energization of the solenoid 166 through circuit Y, thus connecting the servomotor to the manifold. The depressing of the accelerator pedal will cause the V-shaped cam 126' to position its apex above the path of movement of the pin 130 on link 129. Thus this pin will be cammed to engage arm 115 of the double arm lever 112 and thereby cause a shift to second speed drive condition. When the accelerator pedal is fully depressed, the restricting valve 86' will be closed but, nevertheless, air can enter the front chamber of the servomotor through opening 250 to cause it to operate, the air unseating the ball-check valve. Release of the accelerator will now break the circuit Y and cause the clutch to be engaged, the rapidity of engagement of the clutch being determined by the extent of release of the accelerator mechanism as such will control the extent of opening of the restricting valve 86' and the bleeding of air from the forward end of said motor.

When it is desired to go to high speed drive from second speed, all that need be done is to release the accelerator pedal and slightly depress the clutch pedal to close switch C. This will energize the circuit X and cause the servomotor to again be connected to the engine intake manifold. Since the accelerator mechanism is released, the apex 127' of the V-shaped cam 126' will lie below the path of movement of pin 130 on link 129 and thus the shift will be made into high speed ratio since the pin is cammed to connect with arm 113 of the double arm lever 112. When in high speed drive and it is desired to re-obtain second speed drive all that need be done is to fully depress the accelerator pedal.

It is to be noted that in this modified structure the second speed drive can be "skipped" when starting the vehicle in low speed and getting into high speed drive. With low manually engaged and the vehicle moving, the next step in shifting will be to release the accelerator pedal and disengage the clutch. The handle 135 can then be moved to "Hi" to thus disengage the low speed gear and place valve element 67 in the position shown in Figure 50 and the dotted position in Figure 54. Since the accelerator pedal is already released and the clutch pedal 104 depressed, the circuit X will be closed and, therefore, the servomotor will be operated as soon as valve 67 is placed in the position to connect said motor to the manifold. Operation of the servomotor will thus cause a shift to high speed drive as the selector cam 125' is in the proper position due to the released position of the accelerator pedal. Thus it is seen that "skipping" of second speed drive as an effective vehicular drive is accomplished without any special operation which is a desirable feature.

*Operational summary*

In connection with both control mechanisms shown, attention is directed to the ease of control of the vehicle when it is necessary to bring the vehicle to a stop in traffic for some period of time and yet be ready to start rapidly with a minimum of effort. Consider the gearing in high speed when it is brought to a stop. To disengage the clutch, the clutch pedal will be depressed only sufficiently to close switch C. Circuit X will accordingly be energized and the servomechanism operated.

With the control mechanism shown in Figures 1 to 49 inclusively, the operating of the servomechanism will first cause disengagement of the clutch and then a shift to second speed drive, all as previously described. The operator then, to start the vehicle, need only depress the accelerator pedal. This will break the circuit X, thus causing the clutch to engage and power to be transmitted to the gearing which is already in second gear drive, the one desired under most conditions for starting. Thus it is apparent the ease and simplicity of stopping the vehicle and again starting it is all that could be desired. There is no necessity for straining the foot to hold out any clutch during the stopping period. All that is required is a very slight pressure on the clutch pedal sufficient to hold it forward in its idle path of travel.

In the modified construction shown in Figures 50 to 56 inclusively, when the servo-mechanism is operated by slightly depressing the clutch pedal, the clutch will be disengaged but the gearing will remain in high speed (direct-drive). If it is desired to start in this drive, as would be easily possible with a fluid-coupling in series with the friction clutch 4, all that need be done is depress the accelerator pedal, whereupon the circuit X will be broken, the clutch is controlled into re-engagement and power is transmitted to move the vehicle. If it should be desired to start in a lower speed drive, then low speed drive should be employed. To do this the clutch pedal is fully depressed and the gear-shift handle 135 operated to manually establish low speed drive in the manner already described. After the vehicle is started in this low speed by releasing the clutch pedal and depressing the accelerator pedal, the operator can skip second speed drive and go directly into high speed drive by fully redepressing the clutch pedal and then placing the gear-shift lever in its "Hi" range position. Upon release of the clutch pedal and depression of the accelerator pedal the vehicle will accelerate in high speed drive. If it is found necessary to go through second speed drive in starting, then of course the clutch pedal will be held fully depressed, the gear-shift handle placed in the "Hi" position and the accelerator pedal fully depressed. This will select second speed drive and the closing of the Y circuit will cause the power cylinder to again operate to accomplish the shift to second speed. Release of the accelerator pedal will then break the Y circuit, thereby causing the clutch to smoothly re-engage, and the vehicle will move forwardly in second speed drive. High speed drive is then obtained by releasing the accelerator pedal, "tapping" the clutch pedal to close the circuit X and then again depressing the accelerator pedal to cause the clutch to smoothly re-engage and the vehicle to move forwardly in high speed drive.

In the control means shown and described, by way of example, the accelerator mechanism is depressed beyond its normal operating range in making a "kick-down" shift from high speed to second speed drive in order to close circuit Y. It is obvious, however, that this circuit may be closed at other positions of the accelerator mechanism, particularly positions at or on either side wherein the butterfly valve 154 is fully open.

It will be understood that other modifications and variations will be readily apparent to those skilled in the art from the preceding description of presently preferred embodiments of the invention which are for illustrative purposes only, and it is not intended to limit the invention in its broader aspects except as set forth in one or more of the claims appended hereto.

I claim as my invention:

1. In a control mechanism for use with an automotive vehicle clutch having a movable engaging and disengaging member and being associated with an internal-combustion engine having an accelerator mechanism, power-operated means having a movable element operably connected to the movable member of the clutch, and a source of power; the improvements which comprise power control means for connecting the source of power to the power-operated means to cause it to operate, means for causing the control means to be in yieldably locked connecting position when the accelerator mechanism is in either released position or in a position substantially at the limit of its normal range of operation, or in disconnecting position when the accelerator mechanism is in its normal operating range, and means for so controlling the power-operated means when the control means is disconnected that the rate of clutch re-engagement can be varied, said last-named means being separate from the control means and operated by the accelerator mechanism when it is moved into its operating range from either the released position or from a position substantially beyond its normal operating range.

2. In a control mechanism for use with an automotive vehicle clutch having a movable engaging and disengaging member and being associated with an internal-combustion engine having an accelerator mechanism, a fluid pressure actuated motor having a movable element operably connected to the clutch movable member for operating the latter, a source of fluid pressure different from atmosphere, and conduit means between the source and motor; the improvements which comprise a control valve in the conduit means, a solenoid for opening the valve, a source of electrical energy, an electrical circuit for the solenoid including two switches, means for closing one switch when the accelerator mechanism is in released engine idling position, other means operable for closing the other switch, a second electrical circuit for the solenoid including a switch, and means for closing the switch of the second circuit by moving the accelerator mechanism to a position substantially at the limit of its normal open throttle engine operating range.

3. In a control mechanism for use with a clutch having a movable engaging and disengaging member and being associated with an engine having an accelerator mechanism, a fluid motor having a movable element operably connected to the clutch movable member, a source of fluid pressure different from atmosphere, and conduit means between the source and motor; the improvements which comprise a control valve in the conduit means, a solenoid for opening the valve, a source of electrical energy, an electrical circuit for the solenoid including two switches, means for closing one switch when the accelerator mechanism is in released position, other means operable for closing the other switch, a second electrical circuit for the solenoid including a switch, means for closing the switch of the second circuit by moving the accelerator mechanism to a position substantially at the limit of its normal operating range, and means controlled by a movement of the accelerator mechanism into its normal operating range from either released position or its position substantially at the limit of its normal operating range for controlling the rate of movement of the movable element of the motor and the rate of engagement of the clutch.

4. In a control mechanism for use with a clutch having a movable engaging and disengaging member and being associated with an engine having an accelerator mechanism, a fluid motor having a movable element connected to the clutch movable member, a source of fluid pressure different from atmosphere, conduit means between the source and motor, and a control valve in the conduit means; the improvements which comprise a solenoid for opening the valve, a source of electrical energy, an electrical circuit for the solenoid including two switches, means for closing one switch when the accelerator mechanism is in released position, other means operable for closing the other switch, a second electrical circuit for the solenoid including a switch, means for closing the switch of the second circuit by moving the accelerator mechanism to a position substantially at the limit of its normal operating range, means comprising valve means associated with the fluid motor for varying the rate of movement of its element in a clutch engaging direction and means for controlling the valve means so as to effect the varying by the accelerator mechanism when it is moved into its normal operating range either from the released position or the position substantially at the limit of the normal operating range.

5. In a control mechanism for an internal-combustion engine having an accelerator mechanism and a clutch having operatable mechanism including a movable member for causing clutch disengagement following an initial relatively short free travel of said movable member, a fluid motor having a movable element operably connected to said operatable mechanism, a source of fluid pressure different from atmosphere, conduit means between the source and the motor, and a control valve interposed in the conduit means; the improvements which comprise a solenoid for opening the valve, a source of electrical energy, an electrical circuit for the solenoid including two switches, means for closing one switch when the accelerator is in released condition, and other means operable upon mere initial free travel of the movable member for closing the other switch.

6. In a control mechanism for use with a clutch having a movable engaging and disengaging member and being associated with an engine having an accelerator mechanism, a fluid motor having a movable element operably connected to the clutch movable member, a source of fluid pressure different from atmosphere, conduit means between the source and motor, and a control valve in the conduit means which when open places the source in communication with the motor; the improvements which comprise a solenoid for opening the valve when energized, a source of electrical energy, an electrical circuit for the solenoid including two switches, means for closing one switch when the accelerator mechanism is in released condition and opening the switch when moved therefrom, other means operable for closing the other switch, and means operable by the accelerator mechanism when moved from the released condition for controlling the rate of movement of the movable element of the motor and the rate of engagement of the clutch.

7. In a control mechanism for use with a clutch having a movable engaging and disengaging member together with a clutch pedal having a free range of movement before disengaging the clutch and being associated with an engine having an accelerator mechanism, a fluid motor having a movable element operably connected to the clutch movable member, a source of fluid pressure different from atmosphere, conduit means between the source and motor, and a control valve in the conduit means; the improvements which comprise a solenoid for opening the valve, a source of electrical energy, an electrical circuit for the solenoid including two switches, means for closing one switch when the accelerator mechanism is in released condition, and means for closing the other switch when the clutch pedal is moved in its free range of movement toward a clutch disengaging position.

8. In a control mechanism for use with a clutch having a movable engaging and disengaging member and being associated with an engine having an accelerator mechanism, a fluid motor having a movable element operably connected to the clutch movable member, a source of fluid pressure different from atmosphere, conduit means between the source and motor, and a control valve in the conduit means which when open places the source in communication with the motor; the improvements which comprise a solenoid for opening the valve when energized, a source of electrical energy, an electrical circuit for the solenoid including two switches for closing one switch when the accelerator mechanism is in released condition and for opening the switch when moved therefrom, other means operable for closing the other switch, means comprising valve means associated with the fluid motor for varying the rate of movement of its element in a clutch engaging direction, and means for controlling the valve means by the accelerator mechanism.

9. In a control mechanism for use with a clutch having a movable engaging and disengaging member and a fluid motor connected to operate the clutch movable member, together with a control valve for connecting one end of the motor to a source of pressure or to atmosphere; the improvements which comprise operator-operated means for placing the control valve in its two positions, means for trapping air in the other end of the fluid motor for maintaining said element in clutch disengaging position, and means controlled by the operator-operated means when the control valve is moved to place the one end of the motor in communication with the atmosphere for releasing the trapped air and thus control engagement of the clutch.

10. In a control mechanism for use with a clutch having a movable engaging and disengaging element, a fluid motor having a movable element connected to the clutch movable member, a source of fluid pressure different from atmosphere, and conduit means between the source and motor; the improvements which comprise conditioning control valve means, an operator-operated member connected to the conditioning control valve means so as to place one end of the motor in communication with the source or with atmosphere, means for locking air in the other end of the motor, means for releasing the locked air when the conditioning control valve means is moved to a position to place the said one end of the motor in communication with the atmosphere, and other independently operable means for controllably releasing the locked air at a variable rate, whereby the movable clutch element is controlled into engagement.

11. In a control mechanism for use with a clutch having a movable engaging and disengaging element, a fluid motor having a movable element connected to the clutch movable member, a source of fluid pressure different from atmosphere, and conduit means between the source and motor; the improvements which comprise conditioning control valve means, an operator-operated member connected to the conditioning control valve means so as to place one end of the motor in communication with the source or with atmosphere, means for locking air in the other end of the motor only when the conditioning control valve is in a position for placing the said one end of the motor in communication with the source, and means operable at will for controllably releasing the locked air at a variable rate, whereby the movable clutch element is controlled into engagement.

12. In a control mechanism for use with a clutch having a movable engaging and disengaging element and being associated with an engine having an accelerator mechanism, a fluid motor having a movable element connected to the clutch movable member, a source of fluid pressure different from atmosphere, and conduit means between the source and motor; the improvements which comprise conditioning control valve means, an operator-operated member connected to the conditioning control valve means so as to place one end of the motor in communication with the source or with atmosphere, means for locking air in the other end of the motor when the accelerator mechanism is in released position and the operator-operated member and the conditioning valve means is in a position to place the said one end of the motor in communication with the source, and means for controllably releasing the locked air either when the control valve means is moved to a position to place the said one end of the motor in communication with the atmosphere or when the accelerator mechanism is moved from released position into its operating range of movement, whereby the movable clutch element is controlled into engagement.

13. In a control mechanism for use with a clutch having a movable engaging and disengaging member controlled by a pedal and being associated with an engine provided with a carburetor having an intake manifold valve and an accelerator mechanism for controlling said intake valve, an auxiliary valve for the carburetor, a fluid motor having a movable element operably connected to the movable clutch member, conduit means connecting the motor to the intake manifold of the engine, and a control valve associated with the conduit means; the improvements which comprise means operable upon limited initial movement of the pedal when the control valve is in position to place the motor in communication with the manifold to close the auxiliary valve for the carburetor, and means for opening the control valve when the accelerator mechanism is in a position substantially at the limit of its normal operating range and for closing said valve when the accelerator mechanism is moved back into its operating range.

14. In a control mechanism for use with a clutch having a movable engaging and disengaging member and being associated with an engine provided with a carburetor having an intake valve and an accelerator mechanism for controlling said intake valve, an auxiliary valve for the carburetor, a fluid motor having a movable element operably connected to the movable clutch member, conduit means connecting the motor to the intake manifold of the engine, and a control valve associated with the conduit means; the improvements which comprise means operable when the control valve is in position to place the motor in communication with the manifold to close the auxiliary valve for the carburetor, and means for opening the conduit valve when the accelerator mechanism is in a position substantially at the limit of its normal operating range and for closing said valve when the accelerator mechanism is moved back into its operating range, said last-named means comprising a solenoid for opening the conduit valve and closing the auxiliary valve when energized, a source of electrical energy, an electrical circuit including a switch, and means for closing the switch by the accelerator mechanism when in the position substantially at the limit of its normal operating range.

15. In a control mechanism for use with a clutch having a movable engaging and disengaging member including a pedal adapted for an initial limited free movement and associated with a change-speed gearing provided with an operator-operated control lever, a fluid motor having a movable element operably connected to the movable clutch member, a source of fluid pressure different from atmosphere, and conduit means for placing one end of the motor in communication with the source; the improvements which comprise a conditioning control valve in the conduit means, means for opening the conditioning control valve when the operator-operated lever is in a position causing a gear ratio to be operative, other control valve means for the conduit means, means for controlling said other control valve means at will so that the clutch will be disengaged by the motor upon merely free movement of the pedal when the conditioning control valve means is open, means for trapping fluid in the other end of the motor to hold the clutch disengaged, and means for releasing said trapped fluid to engage the clutch when the conditioning valve means is moved by the lever to its closed position and notwithstanding the condition of the said other control valve means.

16. In a control mechanism for use with a clutch having a movable engaging and disengaging member and associated with a change-speed gearing provided with an operator-operated control lever having a position for causing a gear ratio to be operative and a neutralizing position, a fluid motor having a movable element operably connected to the movable clutch member, a source of fluid pressure different from atmosphere, conduit means for placing one end of the motor in communication with the source, and a conditioning control valve in the conduit means; the improvements which comprise means for opening the conditioning control valve when the operator-operated lever is in a position causing a speed ratio to be operative and for closing said valve when the lever is moved toward neutralizing position but prior to assuming such position, other control valve means for the conduit means, means for controlling said other control valve means at will so that the clutch will be disengaged by the motor when the conditioning control valve means is open, means for trapping fluid in the other end of the motor to hold the clutch disengaged, and means for releasing said trapped fluid and thus controlling engagement of the clutch when the conditioning valve means is moved by the lever to its closed position prior to said lever neutralizing the gearing and notwithstanding the condition of the said other control valve means.

17. In a control mechanism for a spring-engageable clutch mechanism, a fluid motor having a movable element, and a control valve for the motor for placing one end thereof alternately in communication with a source of pressure other than atmospheric pressure or with the atmosphere to thus cause the movable element of the motor to be reciprocated; the improvements which comprise means for operably connecting the movable element to the clutch mechanism so as to disengage the clutch by a single stroke of the movable element from one position to another in a single direction, said connecting means between the movable element of the motor and the clutch mechanism comprising a leverage arrangement functioning to cause the clutch engaging spring to transmit a variable force at a low leverage ratio to move the movable element of the motor through its return stroke, said variable force increasing as said return stroke is completed and the clutch is re-engaged.

18. In a control mechanism for a spring engageable clutch mechanism, a source of fluid pressure different from atmospheric pressure, a fluid motor vented to said fluid pressure source and having a movable member, means comprising a control valve for alternately placing one end of the motor in communication with the source and with the atmosphere to thus cause the movable element to be reciprocated, and an operator-operated member connected to actuate said valve, the fluid motor being adapted to disengage the clutch by a stroke of the movable element of the motor from one position to another in a single direction; the improvements which comprise means including a valve separable from the control valve for restricting communication between the atmosphere and the other end of the motor, and means for causing said restricting valve to be operated toward closed position when the first-named valve is operated by the operator-operated member to place the motor in communication with atmosphere, and then subsequently toward open position to thus control a return stroke of the movable member to re-engage the clutch.

19. In controlling mechanism for a clutch having associated therewith a clutch pedal operably connected to disengage the clutch elements after movement through a free-range of travel, power-means operably connected to disengage the clutch, and control means for the power-means; the improvements which comprise means connected for operation by the pedal for controlling the control means to cause operation of the power-means and disengagement of the clutch by a movement of the pedal in its free-range of travel and without necessity of further pedal movement, and other means operable at will for causing the power means to control re-engagement of the clutch.

20. In controlling mechanism for a clutch having associated therewith a clutch pedal operably connectable to disengage the clutch elements after movement from a predetermined point through a free-range of travel, and power-means operably connected to disengage the clutch; the improvements which comprise control means for the power-means, and means connected for operation by the pedal for controlling the control means to cause operation of the power-means and disengagement of the clutch by a movement of the pedal in its free-range of travel and without necessity of further pedal movement, said control means embodying means for causing the power-means to maintain the clutch disengaged after disengagement notwithstanding the pedal is released to its predetermined point.

21. In controlling mechanism for a clutch having associated therewith a clutch pedal operably connectable to disengage the clutch elements after movement from a predetermined point through a free-range of travel, and power-means operably connected to disengage the clutch; the improvements which comprise control means for the power-means, means connected for operation by the pedal for controlling the control means to cause operation of the power-means and disengagement of the clutch by a movement of the pedal in its free-range of travel and without necessity of further pedal movement, said control means embodying means for causing the power-means to maintain the clutch disengaged after disengagement notwithstanding the pedal is released to its predetermined point, and other means operable at will for causing the power-means to control clutch re-engagement.

22. In controlling mechanism for a vehicle friction clutch having a clutch pedal operably connectable to disengage the clutch elements after movement through a free-range of travel and being associated with a vehicle engine having an accelerator mechanism and power-means operably connected to disengage the clutch; the improvements which comprise control means for the power-means, means for controlling the control means to cause operation of the power-means and disengagement of the clutch by a movement of the clutch pedal in its free-range of travel when the accelerator mechanism is in a predetermined position, and means for causing the power-means to control re-engagement of the clutch when the accelerator mechanism is moved from said predetermined position.

23. In controlling mechanism for a clutch including a clutch pedal, a mechanical connection between the pedal and the clutch accommodating a free-range of pedal travel before clutch disengagement, said mechanical connection also embodying means operative to effect disengagement of the clutch without pedal follow-up movement, power-means effective through said mechanical operative means to disengage the clutch, control means for the power-means, and means operable by the clutch pedal during its free-range of travel for controlling the control means to cause the power-means to disengage the clutch, said mechanical connection being always available to utilize operator force to effect clutch disengagement in the event of partial or complete failure of the power-means.

24. In a control mechanism for a clutch mechanism having a movable element biased to engaged condition by spring means and an actuating member; the improvements which comprise connecting means between the actuating member and the movable element whereby the actuating member can disengage the clutch against the action of the spring means and control the spring means to re-engage the clutch, said connecting means including levers so connected together that a high leverage ratio will be present when the actuating member disengages the clutch and a low leverage ratio will be present for the spring means to transmit force to the actuating means during clutch re-engagement, said low leverage ratio increasing as the clutch movable element approaches full engaged condition.

25. In a control mechanism for a clutch mechanism having a movable element biased to engaged condition by spring means and an actuating member; the improvements which comprise connecting means between the actuating member and the movable element whereby the actuating member can disengage the clutch against the action of the spring means and control the spring means to re-engage the clutch, said connecting means including two different length levers pivotally connected together and pivotally mounted on parallel axes, the shorter of said levers being connected to be actuated by the actuating member and the longer of said levers being connected to actuate the movable element of the clutch, said levers being so arranged that during a disengaging of the clutch the pivotal connection therebetween will be moved from one side of a line between the pivotal axes of the levers to the other side.

26. In a control mechanism for a clutch mechanism having a movable element biased to engaged condition by spring means and an actuating member; the improvements which comprise connecting means between the actuating member and the movable element whereby the actuating member can disengage the clutch against the action of the spring means and control the spring means to re-engage the clutch, said connecting means including a pivoted lever having a long arm connected to the actuating member and a short arm, a shaft, a lever connecting the short arm with the shaft, and a short lever connecting the shaft to actuate the movable element of the clutch, said short arm and lever connecting it to the shaft being movable from substantially in line positions to an angular relation less than 180 degrees during the disengaging of the movable element of the clutch.

27. In a clutch having a plurality of operatively engageable and disengageable elements capable of transmitting torque when engaged; the improvements which comprise control means personally movable consecutively through an initial range of free travel and a later range of effective travel, motor means fully actuated upon free travel of said control means for effecting full disengagement of said torque transmitting elements, and means mechanically linked to said control means and to one of said elements for effecting partial or full disengagement of said torque transmitting elements during movement of said control means through said later range independently of the actuation of said motor means.

28. In a clutch having operatively engageable and disengageable elements capable of transmitting torque when engaged, and controllable by an operator-operated pedal having lost-motion initial movement; the improvements which comprise means operable to disengage said clutch, control means operable in response to the lost-motion movement of said pedal to cause said first-named means to operate to fully disengage the clutch elements, and means operable independently of said second-named means to control re-engagement of said clutch by said first-named means.

29. In an automotive vehicle equipped with an accelerator-controlled engine and a torque-transmitting clutch having elements controlled into engaged and disengaged condition by a foot operated pedal having lost-motion initial movement toward an effective clutch disengaging position; the improvements which comprise fluid pressure controlled means operable to disengage said clutch, means operable in response to the lost-motion initial movement of said pedal to cause said fluid pressure means to operate to fully disengage the clutch elements, and means controlled by said accelerator to cause said fluid pressure means to control re-engagement of the clutch.

30. In an automotive vehicle equipped with an accelerator-controlled engine and a torque-transmitting clutch having elements controlled into engaged and disengaged conditions by an operator-operated pedal having lost-motion initial movement; the improvements which comprise fluid pressure means operable to disengage the clutch in response to the lost-motion initial movement of said pedal when operated in a clutch disengaging direction, said pedal being capable of directly disengaging said clutch by continued movement thereof beyond said initial movement in the same direction in the event of partial or complete failure of the fluid pressure means to effect disengagement of said clutch, and means operable to control re-engagement of said clutch as said pedal is released to a position within its aforesaid lost-motion movement.

31. In controlling mechanism for a clutch having disengageable elements and a clutch pedal operably connectable to actuate the elements to partially or fully disengaged position only after movement through a predetermined free-range of travel with respect thereto: the improvements which comprise power-means operably connected to disengage the clutch, said power means having a working-stroke substantially proportional to full disengaging actuation of the clutch elements; control means for the power-means; and means connected for operation by the pedal for controlling the control means to cause a full working-stroke of the power-means and complete disengagement of the clutch in response to a movement of the pedal within its free-range of travel prior to the aforementioned pedal-actuated disengagement of said elements and without necessity of further pedal movement beyond said free-range.

32. In a control mechanism for a clutch having a clutch pedal operably connected to a movable element of the clutch for effecting disengagement thereof following an initial relatively short free travel of the pedal; the improvements which comprise means controlled during said free travel of the pedal for fully effecting power clutch disengagement, including a booster servomotor operably connected to the said movable element independently of the connection of said pedal thereto, means for energizing said servomotor, and control means actuated during free travel of said clutch pedal to effect full energization of said booster servomotor to fully effect power disengagement of said clutch prior to pedal-actuated disengagement thereby, said clutch pedal being adapted at all times for full movement independently of said booster servomotor to effect clutch disengagement.

33. In a control for a clutch mechanism having a movable element, a clutch throw-out bearing, and a clutch release fork; the improvements which comprise a clutch pedal operable upon substantially complete depression thereof to effect engagement of said fork with said bearing, thereby fully disengaging said clutch, said pedal alone being inoperable upon initial free travel thereof to effect such full clutch disengagement, servomotor means operably connected to said fork to also effect fork-bearing engagement upon servomotor energization, means for energizing said servomotor, and control means actuated by said pedal during said free travel thereof to fully disengage said clutch by servometer actuation prior to sufficient pedal movement to directly effect clutch disengagement, said servomotor means, upon energization thereof, effecting full clutch disengagement while said pedal is maintained actuated in its free travel.

34. In a control means for a clutch mechanism having a movable element biased to engaged condition by spring means and a personally-operable actuating member operably connected to said element for moving the same from engaged condition upon substantially full movement of said actuating member; the improvements which comprise means for disengaging said element upon only limited movement of said actuating member including a fluid servomotor, means for establishing differential fluid pressure conditions in said servomotor, means linking said servomotor to said movable element independently of the operative connection of said member thereto, and means coordinating limited movement of said actuating member and second-named means for establishing differential pressure conditions to energize said servomotor for fully disengaging said movable element while said actuating member is maintained operated within its limited movement.

35. In a clutch having operatively engageable and disengageable elements capable of transmitting torque when engaged, and controllable by an operator-operated pedal having lost-motion initial movement; the improvements which comprise actuating means operable to fully disengage said clutch, and means operable in response to the lost-motion movement of said pedal for causing said first-named means to operate to fully disengage said clutch elements, pedal movement causing actuating means operation with subsequent pedal movement after such operation being ineffective to vary the rate or extent of movement of said clutch elements into engagement.

36. In a clutch having operatively engageable and disengageable elements capable of transmitting torque when engaged, and controllable by an operator-operated pedal having lost-motion initial movement; the improvements which comprise power means operable to fully disengage said clutch, means to energize said power means, and means operable in response to the lost-motion movement of said pedal to cause operation of said power means, said pedal being capable of operatively disengaging said clutch directly in the event of failure of said power means by continuous unidirectional pedal movement beyond the initial movement thereof but incapable of varying the rate or extent of clutch re-engagement by said power means after energization thereof.

37. In an automotive vehicle equipped with an accelerator-controlled engine and a torque-transmitting clutch having elements controlled into engaged and disengaged conditions by an operator-operated pedal having lost-motion initial movement; the improvements which comprise fluid pressure controlled means operable to fully disengage said clutch, means for energizing said fluid pressure controlled means, and control means operable in response solely to the lost-motion initial movement of said pedal to cause energization of said fluid pressure controlled means to fully disengage the clutch, said pedal being releasable after being operated to cause energization of said fluid pressure controlled means without causing clutch re-engagement.

GLENN T. RANDOL.

REFERENCES CITED

The following references are of record in the file of this patent:

UNITED STATES PATENTS

| Number | Name | Date |
| --- | --- | --- |
| 1,810,103 | Flagstad | June 16, 1931 |
| 1,858,999 | McCollum et al. | May 17, 1932 |
| 1,905,984 | Hill | Apr. 25, 1933 |
| 1,972,446 | Jander | Sept. 4, 1934 |
| 2,033,572 | Follis | Mar. 10, 1936 |
| 2,049,738 | Hill et al. | Aug. 4, 1936 |
| 2,096,151 | Watt | Oct. 19, 1937 |
| 2,173,116 | Kliesrath | Sept. 19, 1939 |
| 2,175,179 | Caserta | Oct. 10, 1939 |
| 2,183,244 | Misterly et al. | Dec. 12, 1939 |
| 2,187,824 | Britton | Jan. 23, 1940 |
| 2,192,018 | Sanford | Feb. 27, 1940 |
| 2,225,682 | Brewer | Dec. 24, 1940 |
| 2,234,463 | Brewer | Mar. 11, 1941 |
| 2,263,400 | Schwartz | Nov. 18, 1941 |
| 2,293,573 | Szepe | Aug. 18, 1942 |
| 2,327,063 | Randol | Aug. 17, 1943 |
| 2,346,535 | Brewer | Apr. 11, 1944 |
| 2,365,470 | Ingres | Dec. 19, 1944 |